(12) United States Patent
Li et al.

(10) Patent No.: US 12,519,866 B2
(45) Date of Patent: Jan. 6, 2026

(54) USER-INTERACTIVE ENVIRONMENTS FOR AUTOMATING MICROSERVICE CONFIGURATION, PACKAGING, AND DEPLOYMENT

(71) Applicant: Nvidia Corporation, Santa Clara, CA (US)

(72) Inventors: Chunlin Li, Fremont, CA (US); Prashant Gaikwad, Cupertino, CA (US); Kaustubh Purandare, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 165 days.

(21) Appl. No.: 18/450,267

(22) Filed: Aug. 15, 2023

(65) Prior Publication Data
US 2025/0063097 A1 Feb. 20, 2025

(51) Int. Cl.
*H04L 67/51* (2022.01)
*H04L 67/10* (2022.01)

(52) U.S. Cl.
CPC .............. *H04L 67/51* (2022.05); *H04L 67/10* (2013.01)

(58) Field of Classification Search
CPC .............................. H04L 67/10; H04L 67/51
USPC ......................................................... 709/217
See application file for complete search history.

(56) References Cited

U.S. PATENT DOCUMENTS

| 11,146,658 | B2 * | 10/2021 | Nikain | ................ H04L 67/1004 |
| 2015/0088271 | A1 * | 3/2015 | Tauveron | ............... G05B 11/32 700/12 |
| 2021/0037114 | A1 * | 2/2021 | Nikain | .................... H04L 67/34 |
| 2023/0262135 | A1 * | 8/2023 | Tian | .................... H04L 41/5048 709/203 |

* cited by examiner

*Primary Examiner* — Wing F Chan
*Assistant Examiner* — Leon Y Tseng
(74) *Attorney, Agent, or Firm* — Hogan Lovells US LLP

(57) ABSTRACT

Approaches presented herein provide systems and methods for generating a standardized specification and associated interface for application development. One or more microservices may be selected and graphically represented within an interface that receives connection information from one or more users. Connected microservices may have one or more configuration specifications that are auto-populated based, at least, on operation parameters for an associated application and/or related microservices. A development environment may provide for visual representations of connections between microservices along with configuration parameters and validation services. Deployment information may then be generated based on the configuration in the representations.

20 Claims, 21 Drawing Sheets

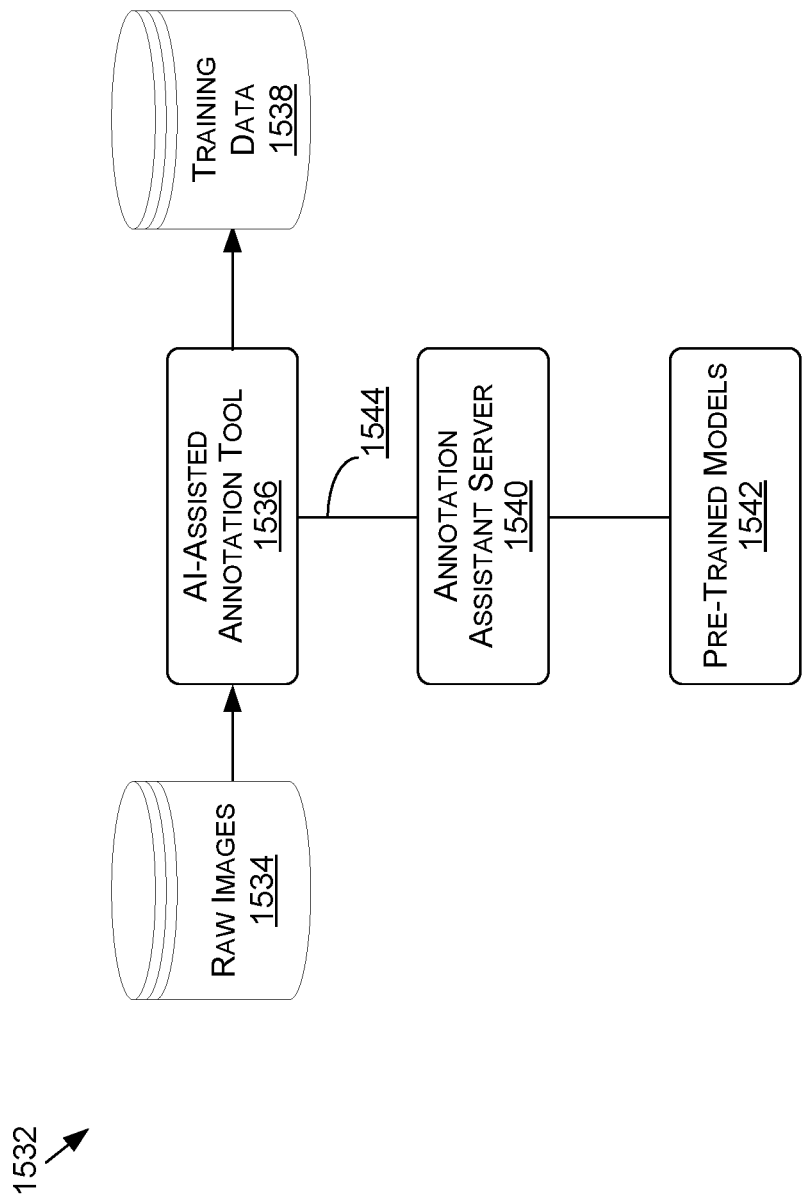

USER-INTERACTIVE ENVIRONMENTS FOR AUTOMATING MICROSERVICE CONFIGURATION, PACKAGING, AND DEPLOYMENT

BACKGROUND

Users may build and deploy applications that include a variety of different services. For example, an application may include different services to receive information, process the information, and then generate a response or perform a defined function. The applications may be hosted by a provider through one or more shared services, such as compute services or hosting services, among others. Additionally, different services from different providers may be integrated into a common application. In order to build and deploy the applications, users must establish declarative configurations, determine specifications for each service and application, name different services, establish endpoint connections, establish secrets and cryptography, and/or the like. Managing and deploying these applications may be complicated and labor intensive, and moreover, adding or updating features may present additional challenges.

BRIEF DESCRIPTION OF THE DRAWINGS

Various embodiments in accordance with the present disclosure will be described with reference to the drawings, in which:

FIGS. 15A and 15B illustrate a data flow diagram for a process to train a machine learning model, as well as client-server architecture to enhance annotation tools with pre-trained annotation models, in accordance with at least one embodiment.

DETAILED DESCRIPTION

Figure 1:
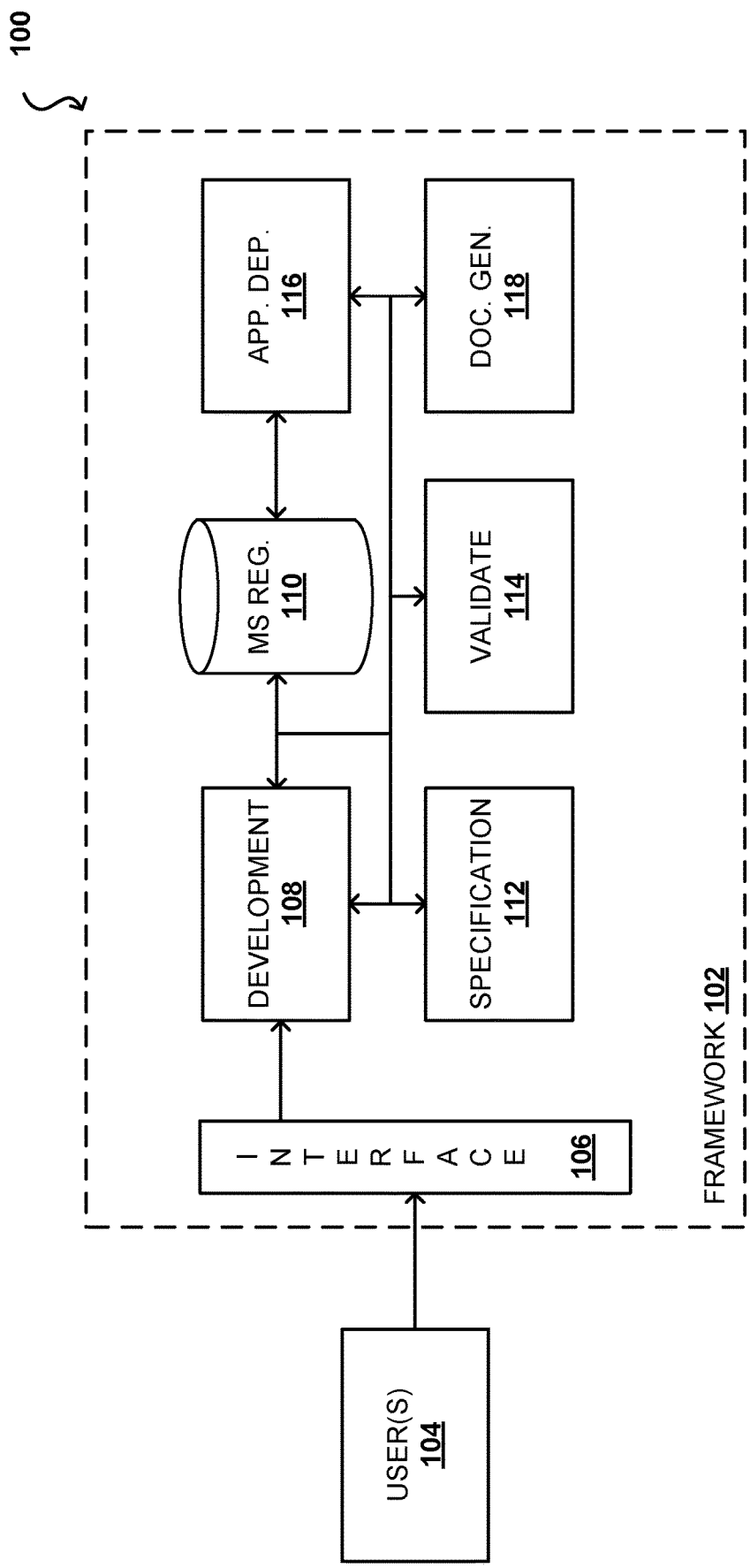
FIG. 1 illustrates an example environment for application development and deployment, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles or machines, semi-autonomous vehicles or machines (e.g., in an in-cabin infotainment or digital or driver virtual assistant application)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational artificial intelligence (AI), generative AI with large language models (LLMs), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing generative AI operations using LLMs, systems for performing light transport simulation, systems for performing collaborative content creation for 3D assets, systems implemented at least partially using cloud computing resources, and/or other types of systems.

Approaches in accordance with various embodiments can be used to create, configure, manage, and deploy applications, such as cloud applications, that may include different microservices. In at least one embodiment, a standardized specification and associated user interface (UI) is provided for users to build applications that integrate and deploy containerized, cloud-based microservices. The environment may provide a standardized specification-such as the Unified Compute Framework (UCF) from NVIDIA Corporation, for example and without limitation—to provide standardized inputs/outputs, connections, and the like with different microservices. The UI may provide an interactive environment for a user to drag and drop different microservices to be included within an application, identify different ports or connections using visual indicators (such as colors, shapes, and/or the like), and then establish connections between different microservices using identified endpoints. In at least one embodiment, when microservices are added to the environment, various information (e.g., configuration information, specifications, secrets, etc.) may be auto-populated according to the standardized specification, such as microservice names, endpoints, ports, etc. Furthermore, validation services may be used in order to do a pre-check/perform static validation of a configuration to determine whether additional services or definitions are needed. The combination of the standardized specification and UI may allow users to quickly build applications that incorporate different container-based microservices by autogenerating information, including Helm™ charts, and exporting the information to a deployment service.

Various embodiments of the present disclosure overcome problems with existing systems and methods for building and deploying applications. Different applications may include a large number of individual microservices. For example, a text-to-speech (TTS) service may include microservices such as a web app, a dialog manager, a TTS pipeline, and/or additional services. These services may be deployed to a compute cluster with the associated requirements to configure and pack each of the microservices into a standardized form, determine different ports, name the services, and then configure various settings. Each of these steps is often manually implemented, which is prone to error and increases time for development and deployment of applications. Systems and methods address these problems by providing both a UI to visualize connections between different microservices and also to simplify the configuration of each microservice in the application by translating the multiple configuration files into an integrated graphical property editing panel, so that developers may fine tune the specific configuration items they are interested in, while other configuration parameters are auto-populated, for example, based on system settings, user preferences, and/or the like.

Various other such functions can be used as well within the scope of the various embodiments as would be apparent to one of ordinary skill in the art in light of the teachings and suggestions contained herein.

FIG. 1 illustrates an example environment 100 in which various aspects of the present disclosure can be performed.

In this example, the environment 100 includes a framework 102, which may also be referred to as a Unified Compute Framework (UCF) that may be used a low-code framework for developers to create and deploy different applications. The applications may be formed from a collection of microservices that may be integrated into, or otherwise associated with, the UCF. Various embodiments may be directed toward cloud-native, real-time or near real-time (e.g., without significant delay), and multi-modal applications, which may include integrating different artificial intelligence (AI) or machine learning (ML) microservices. As a result, the framework 102 may provide an environment in which one or more users can develop, manage, and deploy different applications using associated microservices.

In at least one embodiment, applications refer to one or more computer programs designed to carry out one or more functions. To carry out these one or more functions, applications may be formed from a collection or group of different microservices, which may also be referred to as services. Applications may also include and/or be referred to as cloud-native applications, which refer to applications that are designed to operate across one or more distributed computing environments (e.g., "clouds"), which may include public, private, or hybrid clouds. At least one (e.g., each) microservice used to develop the application may implement its own processes, communications (such as using one or more application programming interfaces (APIs)), and/or operations, such as data collection. Furthermore, various applications and/or microservices may be containerized such that elements of the software are packaged so that the software can be deployed and run in any environment. Accordingly, various embodiments may use the framework 102 to group one or more microservices into an application with the necessary features to execute the microservices to permit the application to perform one or more designated tasks.

The interface 106 may be provided as part of a development engine that enables one or more user(s) 104 to develop and deploy different applications, such as cloud-native applications that use one or more containerized microservices. In at least one embodiment, the user(s) 104 may be registered users having credentialed authorization to access the framework 102 and/or to use one or more microservices, such as through a subscription service. Additionally, the user(s) 104 may further have access to one or more compute clusters or other services, such as storage services, in order to enable operation of different applications, to store settings, and/or the like. The user(s) 104 may provide credentials to the framework 102, such as at an interface 106, that are checked and verified prior to granting access to the framework 102 and its various tools.

In this example, a development engine 108 may be launched and provide an interaction environment to the user(s) 104. The interaction environment may include one or more UIs that receive instructions from the user to perform one or more tasks, such as building an application, as will be described herein. For example, the development engine 108 may provide a low or no-code option for users to browse microservice offerings, configure different microservices, and the like. In at least one embodiment, the UIs may be interactable and receive input commands from users, such as using a "click and drag" option that enables a user to select a service from a service list and then drag the service to a canvas. The microservice may then be provided as a graphical representation within the canvas, such as a box or other icon that includes information about the microservice. The information may include a name, ingress ports, egress ports, associated system requirements, indicators, and/or the like. For example, different ports may be provided with different colors or shapes to facilitate connecting of proper input and output paths for different microservices. Furthermore, various embodiments may also provide graphical indicators regarding microservice functionality, such as a microphone to show that the microservice can receive an input sound or a camera to show that the microservice can process images (e.g., still images, videos, etc.). Additionally, the development engine 108 may interact with one or more services of the framework 102 to enable packaging of applications, modification of settings, generation of Helm™ charts, and/or additional options.

Various embodiments provide a graphical user interface (GUI) associated with the development engine 108. For example, the GUI may enable drag and drop functionality, among other options, to visualize microservice connections and configurations within a given application. By way of example, the different microservices may be represented as nodes, and connections between the microservices may serve as edges. The edges may extend to/from particular ports, which as noted above, may be coded or otherwise indicated to receive particular inputs and/or send particular outputs. The development engine 108 may further provide other interactive features or elements for users, such as a tool bar, drop menus, property windows, and the like. In this manner, the user may launch the development engine 108, select options such as creating a new application or opening an existing application, and then begin to work within the GUI that visualizes the connections between different microservices. As noted herein, the microservices may be or include different containerized services, and therefore, differ from native programming, such as plug-ins for a given application, because the microservices provide their own specific service within a broader application that may be particularized to perform a function using certain microservices. Various embodiments may also provide an option for the user regarding how to operate with the development engine 108, such as providing a command line interface (CLI) in place of, or to supplement, the GUI.

In this example, a microservice registry 110 may include a collection of microservices that are available for use within the framework 102. For example, the microservices may include various AI and/or ML applications, among others, such as different compute services, registry services, security services, and/or the like. In at least one embodiment, the microservice registry 110 may further support local storage of different microservices, as well as access to containerized cloud services. The available microservices within the registry 110 may be accessible through the development engine 108, such as within a list shown in the GUI and/or may be added through the CLI. For example, when a user begins development of a new application, a list of available microservices may be presented as one or more selectable elements that the user can select (e.g., actuate) and then drag over to a canvas space to add the microservice to a given application.

In at least one embodiment, the microservice registry 110 may further include or be associated with a development registry. Both the microservice registry 110 and/or the development registry may be local or remote and may be accessible using the GUI and/or CLI, among other options. The microservices stored within the microservice registry 110 may include artifacts such as microservice specifications 112, Helm™ charts, container images, and other artifacts, such as those associated with deep learning models and configurations, among other options.

A local repository may be created by a host file system and is used to store microservices that are built and/or accessed while using the framework 102. Various features or parameters may be stored within the local repository, such as the specification, Helm™ charts, container images, and other properties noted herein. Furthermore, developers may provide instructions to access these features, and others, at different remote locations. For example, one or more remote repositories may be accessed and provided as a catalog service for containers, pre-trained models, Helm™ charts for deployments, tool kits, software development kits, and/or the like. In at least one embodiment, different repositories may be deployed that contain artifacts specific to the use case/product.

In at least one embodiment, a specific repository may store all necessary microservices for building a particular type of application. For example, a repository associated with a TTS system may include information associated with microservices for a dialog manager, a speech controller, a web app, a text app, and a speech service. As another example, a repository associated with an AI chatbot may include information associated with microservices such as an answer rewriter, a dialog manager, a speech controller, a speech service, a rendering engine, and/or the like.

Various embodiments may permit users to sync or otherwise obtain access to the different microservices provided within the microservice registry 110. For example, a user may verify their credentials and then select a synchronization process for a particular set of microservices. Upon completion of the process, a populated list of microservices may then be provided to the user for interaction and use. Different microservices may be organized by their functionality, type, workflow, associated applications, and the like, as will be described herein.

Further provided in the illustrated example is the microservice specification 112. The microservice specification 112 may standardize how different microservices are defined. For example, definitions may be related toward endpoint specification, infrastructure requirements, and/or configurations, among other options. As a result, the microservice specification 112 may be used to improve interoperability between microservices, and allow quick and simple building of cloud-native applications. For example, using the framework 102, different microservices may be combined and integrated within a common application.

In various embodiments, a microservice is a specification on top of a Helm™ charts to standardize a description of a microservice. Information for the microservice may include names, short descriptions, keywords, tags, and/or the like. Additionally, further standardized information may include a Helm™ chart (e.g., chart name, version, link, etc.), parameter information (e.g., names, types, descriptions, allowable ranges, etc.), endpoint information (e.g., ingress and egress endpoint names, descriptions, ingress port names, service names, protocols, schemes, expected data change format, etc.), and requirements for operation (e.g., passwords, keys, compliance information, etc.). Additionally, an individual microservice may also be defined with documentation, which may include features, usage, key performance indicators (KPIs), issues, references, changes logs, and the like. Furthermore, licensing information may also be provided within the standardized description, thereby providing a large quantity of information to a user to build out different applications that incorporate the microservice. For example, information within the description may be accessed to configure microservice parameters, connect the microservice to other microservices, specify additional details, and/or the like.

In at least one embodiment, the microservice specification may also be associated with different secrets, which may be implemented using files that are read or otherwise processed and used by the microservice. In at least one embodiment, microservices may read the files without knowing how the files were created or mounted within an associated container, thereby creating a layer of abstraction to remove dependency on particular types of cryptography and/or other security (e.g., secret key) management.

Secret requirements for the microservice can be described under a secrets field of a microservice builder input or may be a selectable and editable field in a pre-built microservice. The secrets may be mounted at a particular location and then read by the microservice. For example, a path may be defined with a file name associated with the secret and then sub-processes within the microservice may read the secret from the path, as necessary. Placeholders may be used during development that are then modified at build time, for example when Helm™ charts are created. As noted, secrets may be modified within the GUI in a standard location that may be populated to show specification information for a given added microservice.

A validation engine 114 may test different applications and/or individual microservices within the application prior to deployment (e.g., parameter value validation, connection validation such as whether connected endpoints are compatible, other requirements satisfaction such as secrets are specified, etc.). Different applications may be associated with different compliance rules, which may be either automatically tested by the validation engine 114 and/or may be manually tested by the user.

Upon development and verification, an application deployment service 116 may be used to deploy the application for use with one or more services associated with the user. For example, the application deployment service 116 may obtain information from the document generation service 118, such as a deployable Helm™ chart, that enables the application to run within one or more environments, such as a cloud environment. In at least one embodiment, the application is represented in the form of an executable file with application-specific configuration for each microservice and compatible endpoint connections. This information may be documented and provided to different deployment services. Each application may specify the version of its microservices to improve overall application version control and dependency management.

Accordingly, systems and methods of the present disclosure may provide a framework 102 for development and deployment of applications that include a number of linked microservices. In at least one embodiment, a GUI is provided for one or more users to visualize connections between microservices. For example, a user may select a graphical icon corresponding to a microservice and place that icon within a canvas. The icon may include indicators, such as indicators associated with ingress and egress ports, configuration parameters, and the like. Thereafter, the user may establish connections (e.g., edges) between the microservices (e.g., nodes) to develop an application. Upon completion, the application may be verified, documented, and then deployed for use through one or more systems executing or hosting (e.g., collectively performing the processing for) the framework 102. The framework 102 may also save the application for later adjustments or viewing, for example, to replace different microservices or to use different versions of microservices, among other options.

Figure 2:
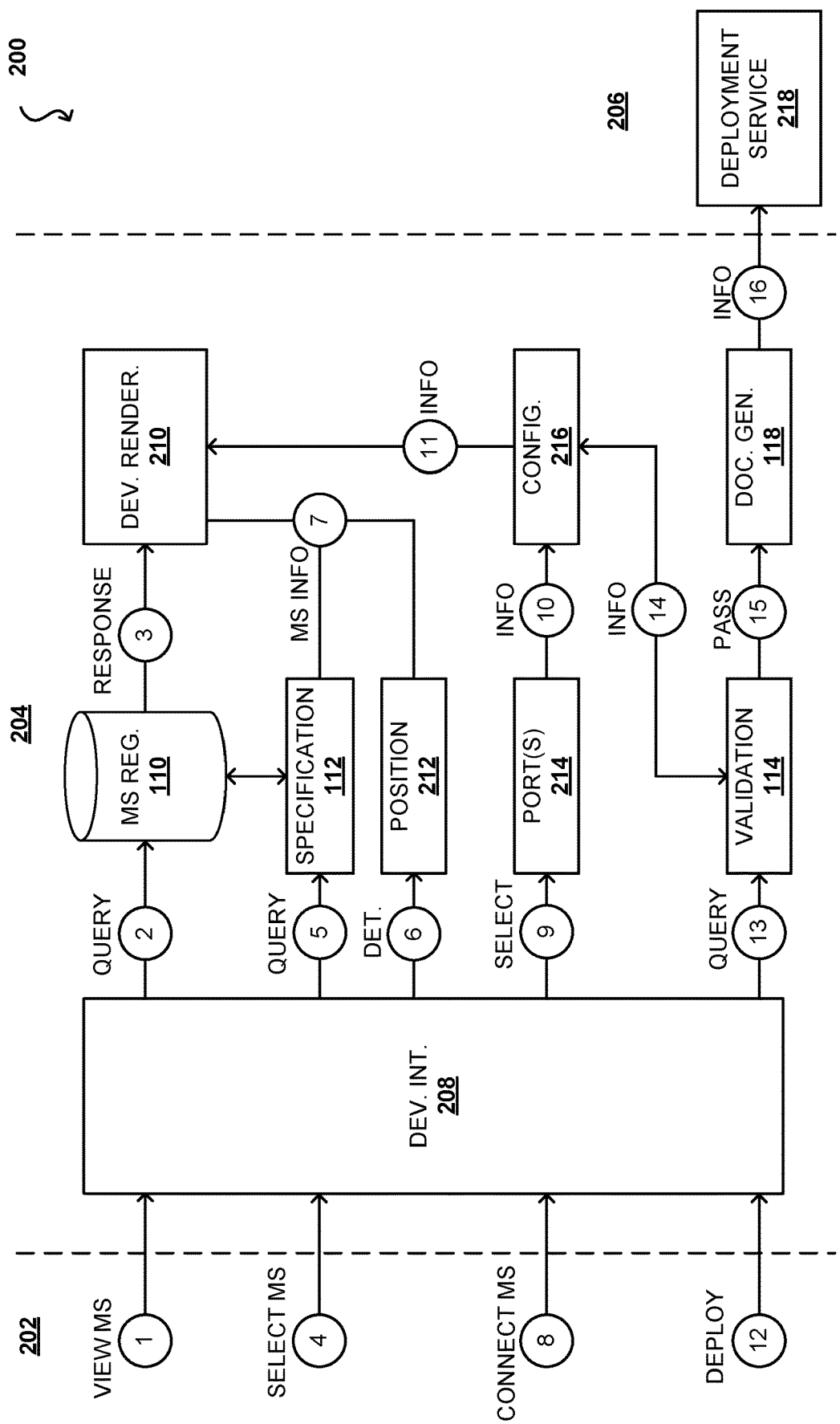
FIG. 2 illustrates an example representation of a work flow for application development and deployment, in accordance with various embodiments.

FIG. 2 illustrates a workflow 200 that may be used with embodiments of the present disclosure. The workflow 200 may include a series of commands that are provided to the framework 102, or portions of the framework 102, in order to view microservices associated with a development environment, select a microservice, connect two or more microservices, and then deploy an application developed using the framework 102. In this example, the workflow 200 may be broken up into different divisions or pipelines for simplification, but such delineations are provided by way of example only and are not intended to limit the scope of the present disclosure. A first area 202 may correspond to a user that is transmitting information over a network, such as via one or more commands that are provided via an input device to an interaction environment. In at least one embodiment, the first area 202 is within the development environment after the user has logged into the service, and as a result, a delineation between the first area 202 and a second area 204 is provided by way of example. The second area 204 may correspond to a development environment, such as one portion of the framework 102, and a third area 206 may correspond to a deployment environment, such as after an application is built and ready for deployment. Each of these areas 202, 204, 206 may be associated with one or more applications or jobs for a given framework.

In this example, a first portion of the workflow is represented by the number "1" and is associated with a request to view available microservices for a given development environment. For example, the user may interact with an icon or other interactable element in order to review a list of available microservices, which may be based, at least in part, on the user's credentials, user's service level with a provider, or combinations thereof. The request is transmitted to a development interface 208, which may process the request and route the request to the appropriate destination. In this example, the request to view available microservices may be transmitted as a query, represented by the number "2" to the microservice registry 110. The microservice registry 110, as noted herein, may include a collection of available microservices that are accessible with the development environment. The list may then be transmitted as a response, represented by the number "3" to a development rendering service 210, which may then render information within the GUI for the user. For example, a list of available microservices may be populated within a particular region. The development rendering service 210 may be used to provide the list in a variety of presentation types, such as a textual list, a list of icons, and/or the like. Furthermore, presentation of the list may also include search functionality, grouping, and other tools to organize and simply access to the microservices within the list.

In at least one embodiment, the workflow may include additional operations, such as the user selecting a microservice for use, represented by the number "4." Selection may include the user interacting with the microservice, such as clicking on its name or a selectable icon, or by inputting a command, among other options. In at least one embodiment, the microservice may be rendered within a canvas of the GUI to visualize connections between different microservices. Accordingly, responsive to the selection command, at least two different processes may take place to both select the appropriate microservice and to position the microservice within the canvas. For example, a query may be provided to the microservice specification 112 to obtain the given specification for the selected microservice, as represented by the number "5" which may further obtain additional information from the microservice registry 110. The specification may determine information such as the name of the service, endpoints, ports, associated microservices, and/or the like. This information may be used to render a representation of the microservice within the canvas, as noted herein. Additionally, a determination regarding position of the microservice may also accompany the selection, as represented by the number "6." A position detector 212 may identify a location for the representation of the microservice, such as determining where a user ends a click and drag operation, by looking at coordinates entered by a user, and/or the like. Upon completion of these operations, the information associated with a location within a canvas to place a representation of the microservice may be determined and combined with the specification information and then transmitted to the development rendering service 210, as represented by the number "7." In this manner, the GUI may provide a representation to the user regarding the selected microservice along with additional microservice information, such as ports, endpoints, indicators, name, configuration information, and the like. In at least one embodiment, the information associated with the microservice may be provided within a separate viewable panel, within a boundary of an icon representing the microservice, and/or combinations thereof.

Various embodiments may also use the workflow to connect different microservices together. For example, a first microservice may be used to collect data and then a second microservice may use that data to perform one or more operations. The GUI may be used to visually represent a connection between the different microservices and also may populate or otherwise fill in configuration information for the connection. For example, the user may select a port of the first microservice and then select a port of the second microservice, which may be rendered as an edge (e.g., line, connection) between the two microservices. The specification information previously obtained when placing the microservices may then be used to automatically configure certain parameters of the connection. In this example, the connection request may be provided, represented by the number "8." The connection request may involve the user clicking between microservices, as noted herein, or may be a command line request, among other options. For example, in various embodiments a microservice may only have on logical endpoint, and as a result, a connection may be automatically established and visualized in the GUI. Additionally, in embodiments, different automated features may be deployed in order to generate connections for users automatically based on their intended service goals. For example, if the user were to specify the application was for performing text to speech processing, the development environment may automatically present common microservices for such an application with recommended connections, and thereafter, the user could adjust or otherwise modify connections or parameters based on their intended purposes.

The connection request may further include a selection request, represented by the number "9" for picking two ports between the microservices using a port(s) selector 214. The port(s) selector 214 may obtain information from the microservice specification 112 in order to determine which ports are available and/or which ports may be linked together. Such a representation may be provided visually to the user, for example, by having ports that can be connected represented as a common color or shape. The selected ports may then be provided for configuration generation (such as by using a configuration generator 216), as represented by the number "10." For example, port addresses, configuration parameters, names, security settings, and/or the like may be generated by the configuration generator and then provided to the development rendering service 210, as represented by the number "11." As a result, the connection between the two microservices and the configuration information may be rendered and visualized within the GUI.

Users may development applications that include a number of different microservices for deployment as an application. A command may be received to deploy the application, as represented by the number "12." Prior to deployment, the user may wish to validate or otherwise test the application to ensure reliable operation by end users. A testing query may be established, represented by the number "13," and provided to the validation engine 114. The validation engine 114 may obtain configuration information from the configuration generator 216, as represented by the number "14," and then test the application. If the application passes, a pass indicator, represented by the number "15," may be provided to the document generation service 118, which may be used to create Helm™ charts, documentation, and the like for the application. The deployment files may be created and then sent to a deployment service 218, represented by the number "16," for deployment and use by end users. Accordingly, systems and methods may provide an interactive environment in which a user can visually select and connect microservices and then deploy the services for end users. Furthermore, in at least one embodiment, the framework provides features to evaluate configuration parameters and auto-populate certain parameters, thereby reducing the work required of users in creating and deploying (e.g., cloud-based, microservice) applications.

Figure 3A:
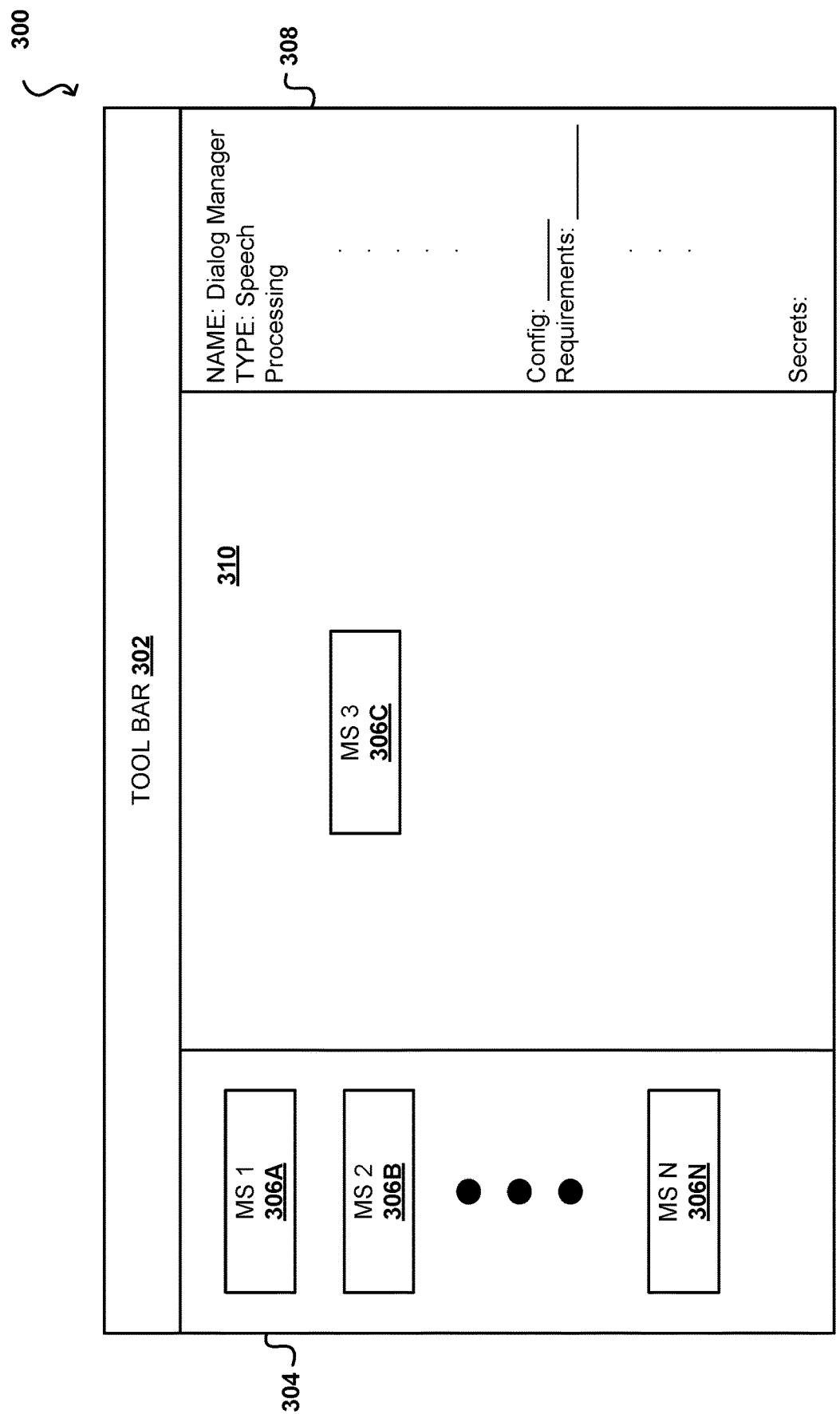
FIG. 3A illustrates an example representation of a graphical user interface (GUI) for application development and deployment, in accordance with various embodiments.

FIG. 3A is a representation 300 of a GUI that may be used with embodiments of the present disclosure. In this example, the GUI includes different areas of regions, which may be referred to as windows or sections. For example, a tool bar 302 may correspond to a first window that includes a variety of selectable icons, such as drop menus, quick launch, icons, and/or the like. The tool bar 302 may be a customizable interface that the user can adjust, hide, or otherwise modify to fit particular preferences. By way of example, the user may choose certain icons that are used more often than others, such as icons to save an application, add a new microservice, and/or the like. Additionally, in at least one embodiment, the display of the tool bar 302 may be moveable such that the tool bar 302 is displayed not at a top of the GUI, but may be instead displayed along the sides or at the bottom. Moreover, the tool bar 302 may be a collapsible element that is visibly responsive to an input (e.g., hovering over the toolbar with a cursor, clicking a button, etc.) and may be invisible or collapsed responsive to one or more actions (e.g., hovering over a different area, not selecting an item for a threshold period of time, clicking a button, etc.).

Further illustrated is a microservice menu 304, which in this example includes a plurality of selectable microservice icons 306A-306N corresponding to different microservices available for use with the development environment. For example, each microservice icon 306A-306N may be a graphical representation of one or more microservices that are available for use via the microservice registry. The microservices may also be grouped together and positioned within the microservice menu 304 in groups or expandable/collapsible clusters. For example, each microservice for TTS services may be within one grouping while microservices for image recognition may be in another. In this manner, the available microservices may be organized and clustered together for ease of selection and use. The microservice icons 306A-306N may include identification features, such as pictures or text to provide information to the user. For example, a microservice to receive an audio input may include a name and a microphone.

Further illustrated in the embodiment is a property panel 308 that includes information for a given microservice, such as the microservice icon 306C that has been selected and/or positioned within a canvas 310. The property panel 308 may include information such as a name, type of application, configuration setting, requirements for execution, and associated secrets. In various embodiments, different portions of information associated with the property panel 308 may be auto-populated based on one or more user settings. For example, a user may create an application for an encrypted environment, and as a result, the associated secrets will auto-populate for that environment. By way of further example, the name may be automatically populated, and different configuration settings—such as a time out or a port address—may be pre-specified.

The canvas 310 may visually represent the microservices associated with a given application. For example, the user may click and drag microservices 306 from the microservice menu 304 into the canvas 310 to add the microservices 306 to the application. In this manner, the user can quickly add microservices while also visualizing the services provided by the application. This may be more intuitive than using a command line interface because the visual representation may allow the user to quickly identify which microservices are included, which are remaining, which are connected, and/or additional information.

Figure 3B:
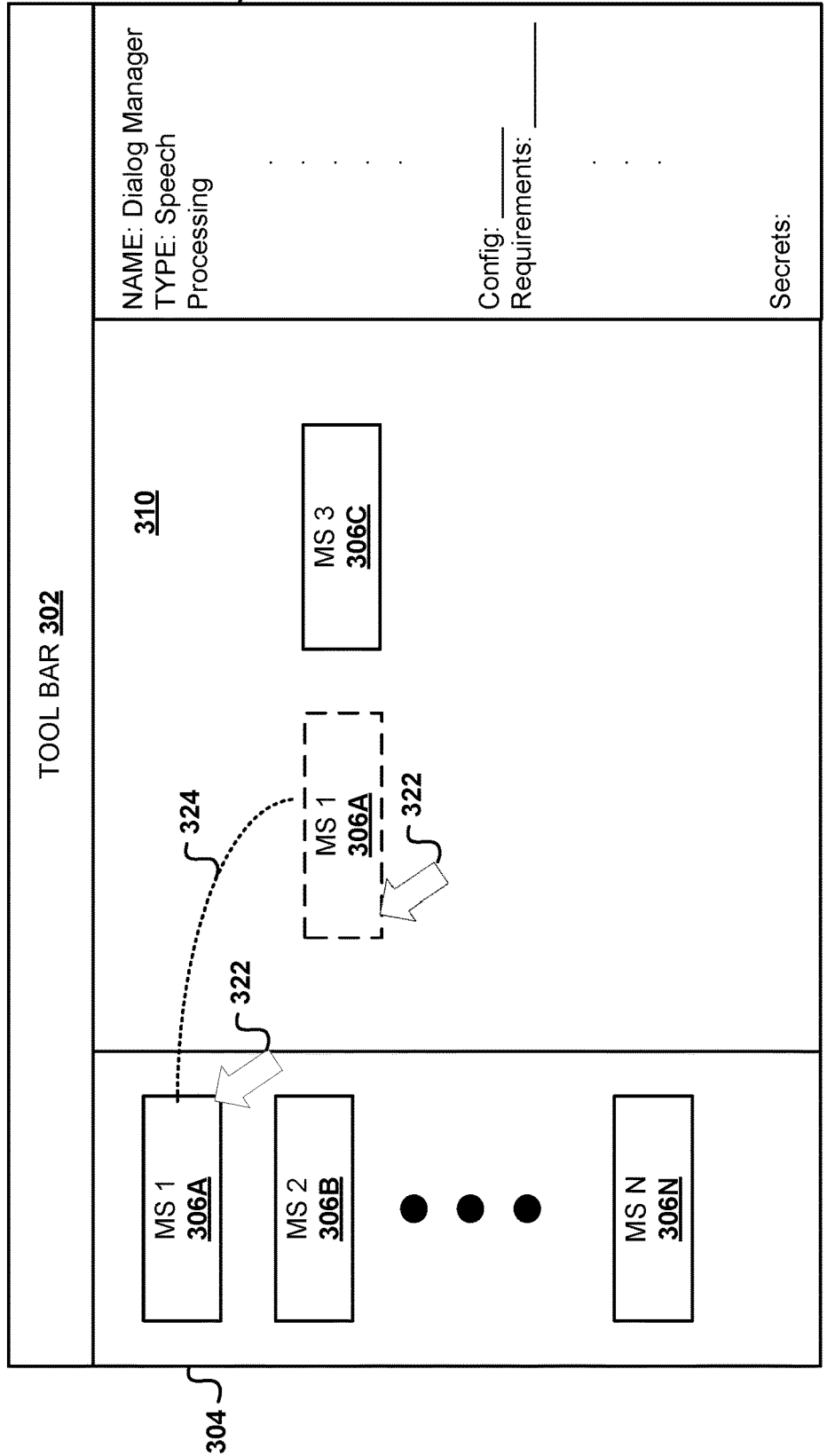
FIG. 3B illustrates an example representation of a graphical user interface (GUI) for application development and deployment, in accordance with various embodiments.

FIG. 3B illustrates a representation 320 of the GUI associated with a development environment. In this example, the representation 320 illustrates how a microservice 306 may be added to the canvas 310 via user interaction, such as a click and drag action. In this example, the user may interact with the GUI via a cursor 322 by selecting (e.g., clicking) on the microservice icon 306A and then, while maintaining the click, moving the representation of the microservice icon 306A into the canvas 310, as represented by the dashed movement pattern 324. When the user releases the selection/click, the microservice icon 306A may be added to the application, as shown in the canvas 310. This process may be repeated any number of times in order to build the application. For example, additional microservices 306 may be added. In at least one embodiment, adding a first microservice may automatically add a second microservice and/or may provide a prompt to add a second microservice. For example, a first microservice may include functionality that requires an input from a second microservice. As a result, the inclusion of the first microservice may require inclusion of the second microservice. By linking different microservices together, embodiments may provide for easier, faster development of applications. Moreover, adding or notifying users to add certain microservices reduces a likelihood of error from insufficient input information, thereby reducing frustration for the users with developing applications, which may increase a likelihood of the user continuing to use the service or recommending the service to others.

Figure 3C:
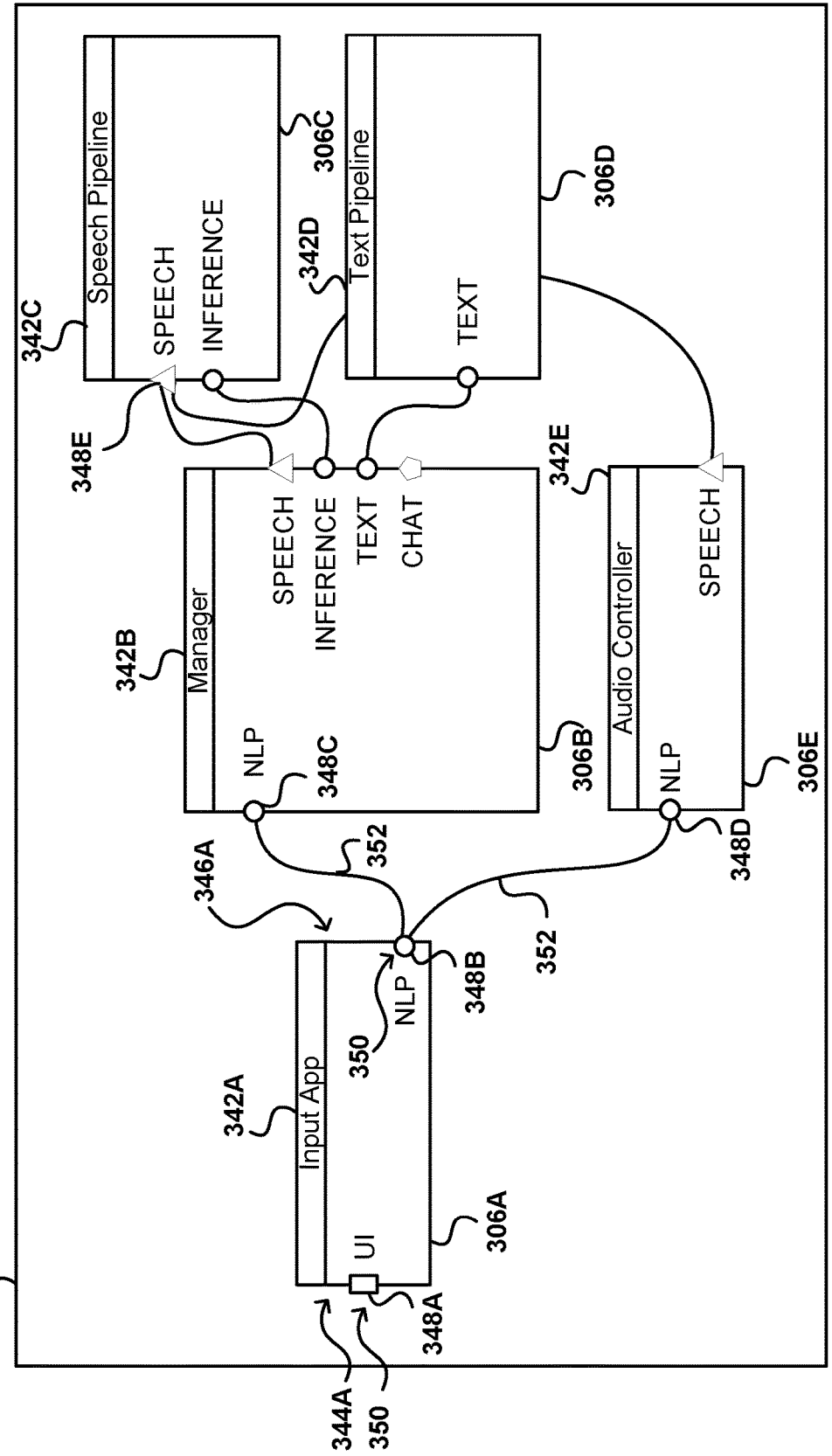
FIG. 3C illustrates an example representation of a graphical user interface (GUI) for application development and deployment, in accordance with various embodiments.

Various embodiments of the present disclosure may provide for additional visualization for applications by illustrating how different microservices 306 are connected to one another, as shown in the representation 340 illustrated in FIG. 3C. The representation 340 includes the canvas 310 and a plurality of microservices icons 306A-306E. As noted herein, each microservice may be associated with a different operation or function, such as obtaining audio information, pre-processing, compute services, and/or the like. The microservices icons 306A-306E are represented as graphical icons that include headers 342A-342E that provide a name for the associated microservices 306. The headers 342A-342E may also include icons, colors, and/or the like in order to differentiate or provide further information to users. For example, an icon may be included related to the functionality of the microservice, such as a text-input microservice having a cursor or a TTS pipeline including a microphone. Additionally, different functionality may be associated with a different color scheme, such as a first color for microservices that collect information and a second color for microservices that provide an output to a user.

The associated microservices 306 include an ingress side 344 and an egress side 346 and associated endpoints 348 on each of the ingress and egress sides 344, 346. The ingress side 344 may correspond to different endpoint 348 that receives information from a source, such as a user input or from another microservice 306. For example, with respect to the microservice icon 306A, the ingress side 344A includes an ingress endpoint 348A associated with a user interface and the egress side 346B includes an egress endpoint 348B associated with a natural language processing (NLP) system. The endpoints 348 may be further differentiated using various indicators 350, including an icon shape (e.g., a rectangle for the endpoint 348A and a circle for the endpoint 348B), a color, and/or combinations thereof. For example, both endpoint 348A, 348B may have indicators 350 of the same shape but different colors. By color-coding or otherwise coding the endpoint 348, the user may be provided with information associated with appropriate connections for different endpoints 348. In at least one embodiment, an endpoint 348 with a particular indicator 350 may provide an error message when a user attempts to join the endpoint 348 to another endpoint 348 having a different indicator 350, such as by providing an error alert when a user attempts to join a square indicator to a circle indicator. As a result, the user may be provided with real-time or near-real time feedback regarding different connections between microservices 306 associated with a given application.

Embodiments of the present disclosure may provide guidance for connecting different endpoints 348 together via both the indicators 350 and one or more names or labels applied to the endpoint 348. For example, the microservice icon 306A includes the egress endpoint 348B marked as "NLP" with the indicator 350 as a circle. Similarly, the microservice icon 306B has an ingress endpoint 348C marked as "NLP" with the same indicator 350. Additionally, the microservice icon 306E has an ingress endpoint 348D marked as "NLP" also with the same indicator 350. As a result, two connections 352 (e.g., "edges") are formed between the microservice icons 306A, 306B, 306E. In this manner, information that is acquired by the microservice icon 306A may then be provided to each of the microservice icons 306B, 306E for further processing and/or transmission to additional microservices 306.

In various embodiments, the recommended connections may also be provided as a prompt or instruction to the user. For example, after adding certain microservices 306, the user may receive an instruction such as "microservice 1 egress endpoint should be attached to microservice 2 ingress endpoint and to microservice 3 ingress endpoint." As a result, the user may be provided with a guided step-by-step process to develop applications using the selected microservices.

In at least one embodiment, indicators 350 may be different for various microservices 306. For example, the microservice icon 306B includes a number of egress endpoints 348 having different indicators 350, such as a triangle, a circle, and a pentagon. Furthermore, the indicators 350 may also be colored or shaded differently. As shown in FIG. 3C, a single ingress endpoint or egress endpoint 348 may include multiple connections 352. For example, the egress endpoint 348B includes two different connections 352, one to the microservice icon 306B and one to the microservice icon 306E. Additionally, an ingress endpoint 348E for the microservice icon 306C includes inputs from both the microservice icon 306B and the microservice icon 306E. As a result, different combinations of microservices may be used within a given application in order to generate an output and/or perform an intended functionality.

Figure 4A:
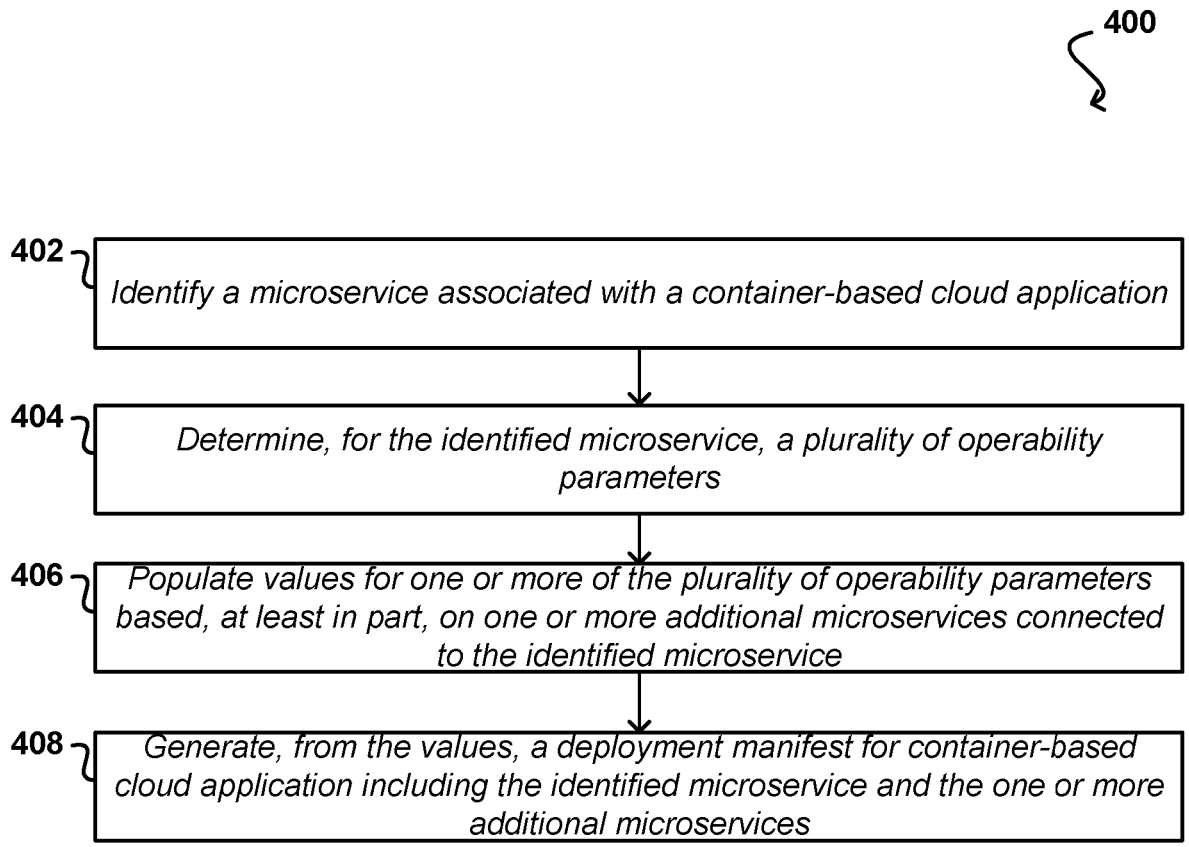
FIG. 4A illustrates an example process for generating a deployment manifest, in accordance with various embodiments.

FIG. 4A illustrates an example flow chart for an example process 400 to generate a deployment manifest for a cloud-based application, that may be used with embodiments of the present disclosure. It should be understood that for this and other processes presented herein that there can be additional, fewer, or alternative operations performed in similar or alternative order, or at least partially in parallel, within the scope of various embodiments unless otherwise specifically stated. In this example, a microservice is identified for a container-based cloud application 402. The cloud application may be an application that is developed using cloud-hosted microservices that may be used to perform one or more functions or tasks to support an overall function of the application. For example, an application for object identification may include microservices for content receipt, content segmentation, computer vision, and/or the like. Some (e.g., each) of these microservices may be connected to one another, such that an output from one microservice (e.g., at an egress endpoint) may be provided to another connected microservice (e.g., at an ingress endpoint).

In at least one embodiment, a plurality of operability parameters may be determined for the identified microservice 404. For example, operability parameters may include information such as names, port addresses, ingress endpoints, egress endpoints, protocols, and other information. Furthermore, the operability parameters may also be a function of how the microservice is used. For example, image segmentation may be used in different contexts, and as a result, operability for one context, such as object detection, may have different parameters when compared to another context, such as object generation. The operability parameters may also be based on user preferences or restrictions, such as underlying hardware associated with the user or service level agreements. Moreover, additional application settings may also be considered operability parameters, such as security settings.

Various embodiments of the present disclosure may be directed toward an application development environment to visualize and simplify application development. Accordingly, in at least one embodiment, values for one or more of the plurality of operability parameters may be auto-populated 406. The values may be auto-populated based, at least in part, on one or more additional microservices associated with the application and/or connected to the identified microservice. For example, as noted herein, a particular microservice may receive a certain type of input, and as a result, input information may be known and auto-populated with default values, rather than requesting such information from users. Additionally, in another embodiment, information such as microservice names or connection addresses may be auto-populated based on various settings so that an associated user does not need to modify those settings, unless desired. For example, one or more ports may be assigned to a particular microservice, and if the ports are fungible, then assigning a random port maintains functionality while also reducing a burden on the user creating the application. Moreover, auto-populating a certain value may also be used to auto-populate values for associated or connected microservices to ensure matching and/or compliance, thereby further simplifying the application development process.

In at least one embodiment, a deployment manifest is generated for the application 408. The deployment manifest may include information such as configuration settings for different applications, Helm™ charts, and or the like. Additionally, the application may be packaged as an executable file that may be provided for deployment. As a result, users may quickly generate cloud-based applications using supported and available microservices, rather than going through a process of developing individual microservices and then manually establishing different operability parameters.

Figure 4B:
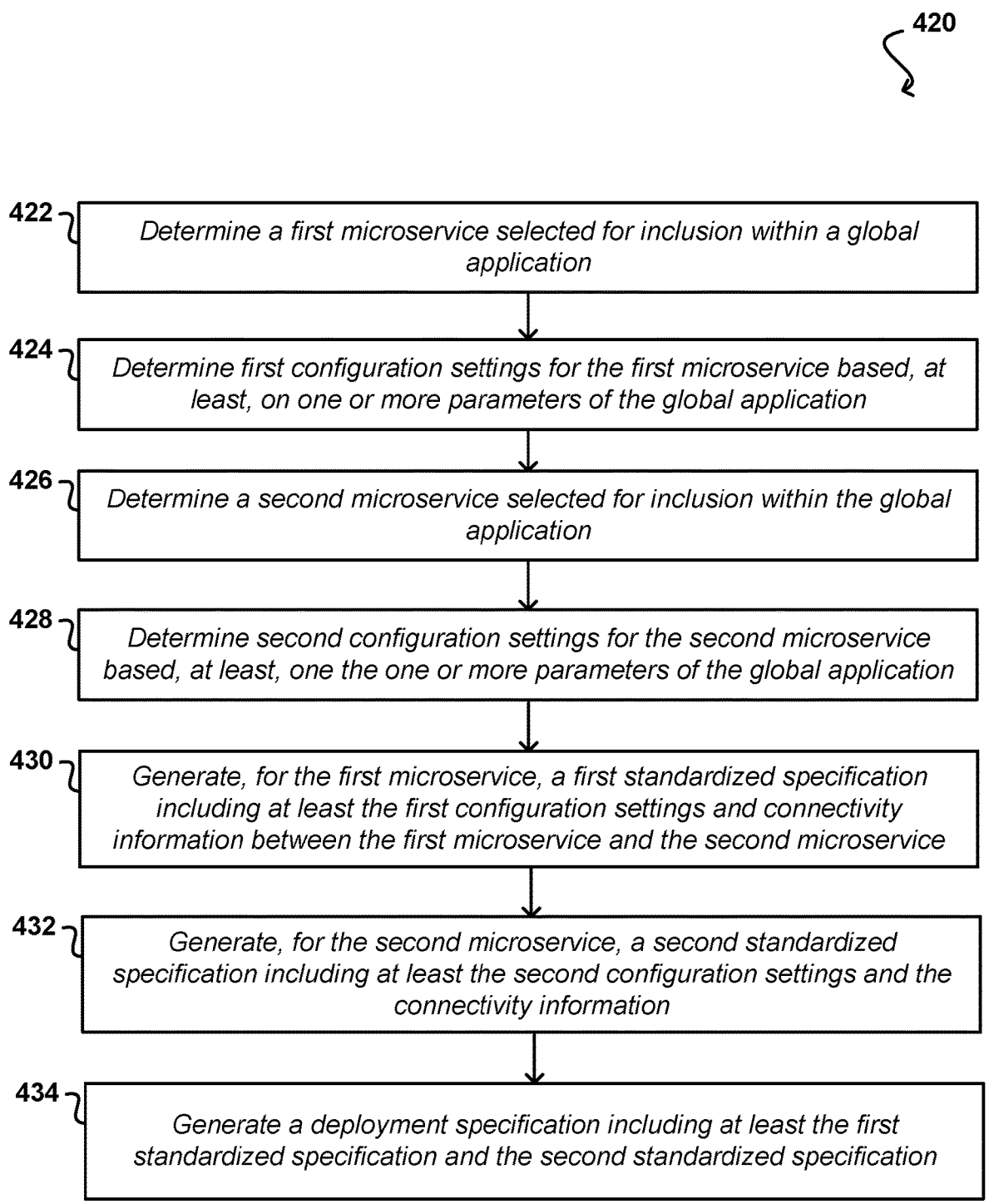
FIG. 4B illustrates an example process for generating a deployment manifest, in accordance with various embodiments.

FIG. 4B illustrates an example flow chart for an example process 420 to generate a deployment specification for a cloud-based application. In this example, a first microservice for inclusion within an application is determined 422. The first microservice may be selected from a microservice register, such as one provided by a service entity that also provides access to an application development environment, or the microservice may be one developed independently by the user, a microservice from a third-party, and/or combinations thereof. For example, the user may particularly train or modify a provided microservice, among other options. First configuration settings for the first microservice may be determined 424. The configuration settings may be related to parameters such as names, ingress endpoints, egress endpoints, and the like. In at least one embodiment, one or more parameters of the application are used to determine the configuration settings for the first microservice. For example, if the application is related to a certain encryption standard, that standard may also be applied to the first microservice. As another example, if the application has a dedicated set of resources, various settings for the first microservice may be modified and/or established based on that dedicated set of resources. The settings may be auto-populated upon adding the first microservice to the application.

In at least one embodiment, a second microservice is also selected for inclusion within the application 426 and one or more second configuration settings for the second microservice are also determined 428. The first microservice may be connected to the second microservice such that information from the first microservice is transmitted to the second microservice and/or vice versa. The connections between the two microservices may also be used to determine one or more of the first or second configuration settings. For example, a connection at a certain endpoint may be transferred over and/or copied between each microservice.

A first standardized specification may be generated for the first microservice 430 and a second standardized specification may be generated for the second microservice 432. In at least one embodiment, the standardized specification may include particularly selected information that is presented and/or populated in a predetermined way in order to generate a deployment specification 434. For example, names for different microservices may be populated in a manner such that there are no conflicts between microservices. Similarly, certain connection parameters may be established. As a result, the deployment specification may then be used to deploy the application that includes the microservices.

Figure 5A:
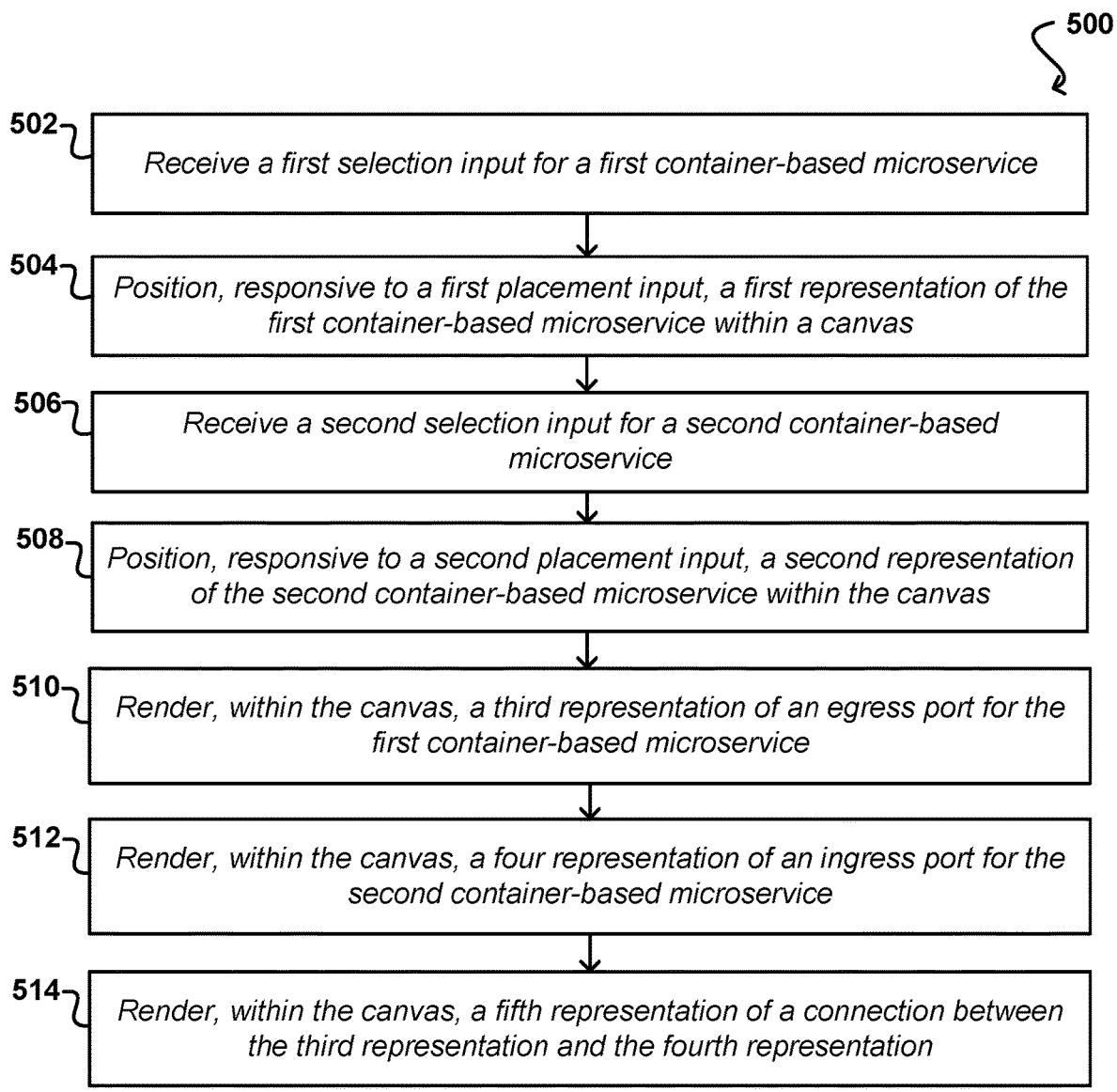
FIG. 5A illustrates an example process for rendering a development environment, in accordance with various embodiments.

FIG. 5A illustrates an example flow chart for an example process 500 to provide a graphical representation of microservice connections for an application. In this example, a first selection is received corresponding to a selection of a first container-based microservice 502. For example, a window within a development environment may provide a listing of available microservices and a user may select one, such as using an input device. A representation of the first container-based microservice 502 may be positioned within a canvas area based on a first placement input 504. In at least one embodiment, the first placement input may correspond to clicking and dragging the representation of the first microservice to a particular location and then releasing or otherwise providing an input indicating a location to place the representation of the first microservice.

In at least one embodiment, the user may select and position additional microservices for use with an application. For example, a second selection input for a second microservice may be received 506 and a second representation of the second microservice may be positioned within the canvas responsive to a second placement input 508. Various graphical representations may be present to illustrate the microservices, such as labels corresponding to names and functionalities, indicators, and/or the like. In at least one embodiment, a third representation of an egress port of the first microservice is rendered 510 and a fourth representation of an ingress port of the second microservice is rendered 512. The representations for the ingress and egress ports may include geometric shapes, colors, labels, and/or the like. For example, an ingress port may be associated with an icon having a certain shape and color that may correspond to an appropriate egress port associated with information that may be provided to the ingress port.

Various embodiments provide an environment for a user to connect different microservices to form an application and to graphically render such connections. In at least one embodiment, a fifth representation may be rendered illustrative of a connection between the third representation and fourth representation 514. The connection may be rendered responsive to a connection input provided by a user and/or automatically based on system settings. For example, a user may determine which ingress and egress ports to connect based on a desired functionality of the application. Additionally, in certain embodiments, various microservices may have predetermined input parameters, and as a result, an associated microservice providing such parameters may be automatically linked and/or connected to the microservice when the microservice is added to the application. Accordingly, users may quickly and graphically develop applications including a variety of different connected microservices.

Figure 5B:
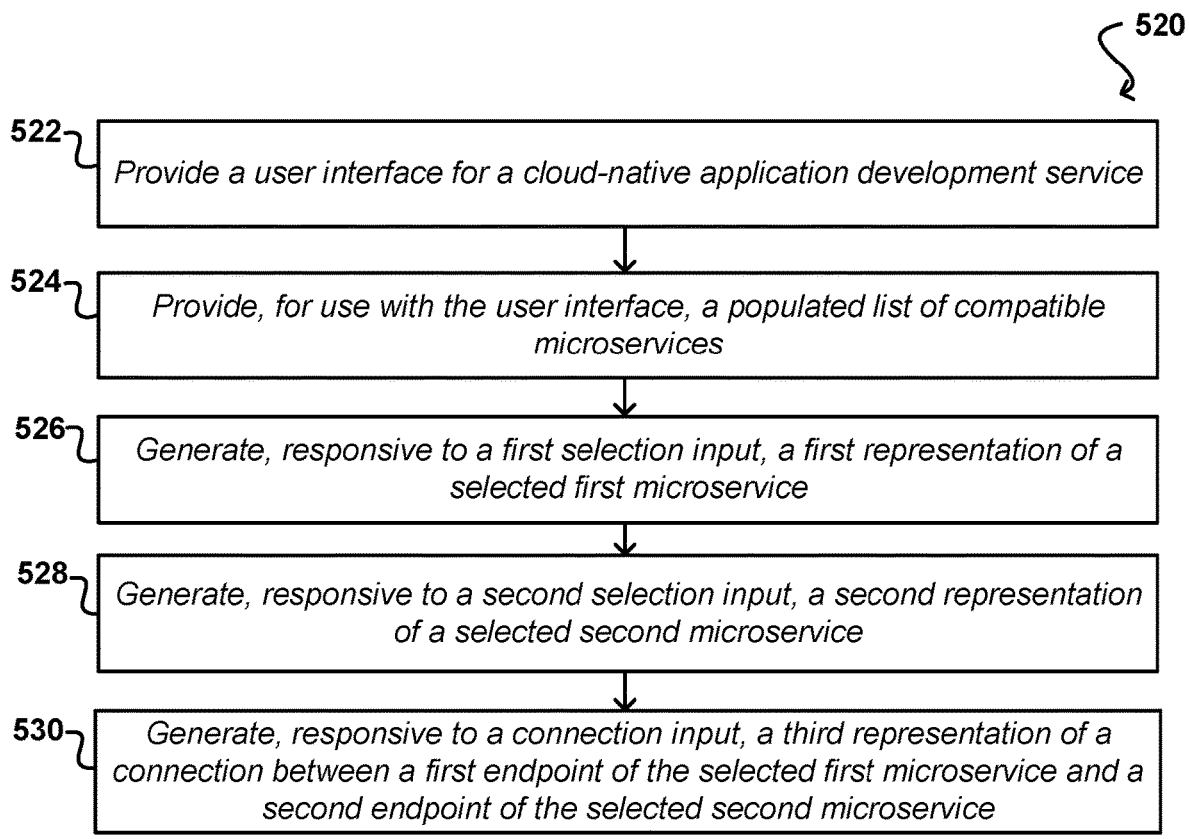
FIG. 5B illustrates an example process for rendering a development environment, in accordance with various embodiments.

FIG. 5B illustrates an example flow chart of an example process 520 to graphically represent an application within a development environment. In this example, a UI for an application development environment may be provide to a user 522. For example, the application development environment may be part of an offering to enable users to develop applications using a selection of microservices. In at least one embodiment, a populated list of available microservices is provided for use with the UI 524. For example, a microservice registry may maintain a list of available microservices and a user may select particular microservices for use with a given application.

A first representation for a first microservice may be generated responsive to a first selection input 526 and a second representation for a second microservice may be generated responsive to a second selection input 528. For example, graphical icons for different microservices may be populated and positioned within an interactive environment, such as a canvas, where the representations may be modified or interacted with in order to adjust one or more settings, established connections, and the like. In at least one embodiment, a third representation of a connection between a first endpoint of the selected first microservice and a second endpoint of the selected second microservice is rendered 530. For example, a line or edge (which may be color coded or otherwise provided with indicators associated with the connection or parameters of the connection) may be graphically represented between the first and second representations within the canvas. In this manner, the user can quickly and simply visualize the connections between different microservices associated with an application.

As discussed, aspects of various approaches presented herein can be lightweight enough to execute on a device such as a client device, such as a personal computer or gaming console, in real time. Such processing can be performed on, or for, content that is generated on, or received by, that client device or received from an external source, such as streaming data or other content received over at least one network. In some instances, the processing and/or determination of this content may be performed by one of these other devices, systems, or entities, then provided to the client device (or another such recipient) for presentation or another such use.

Figure 6:
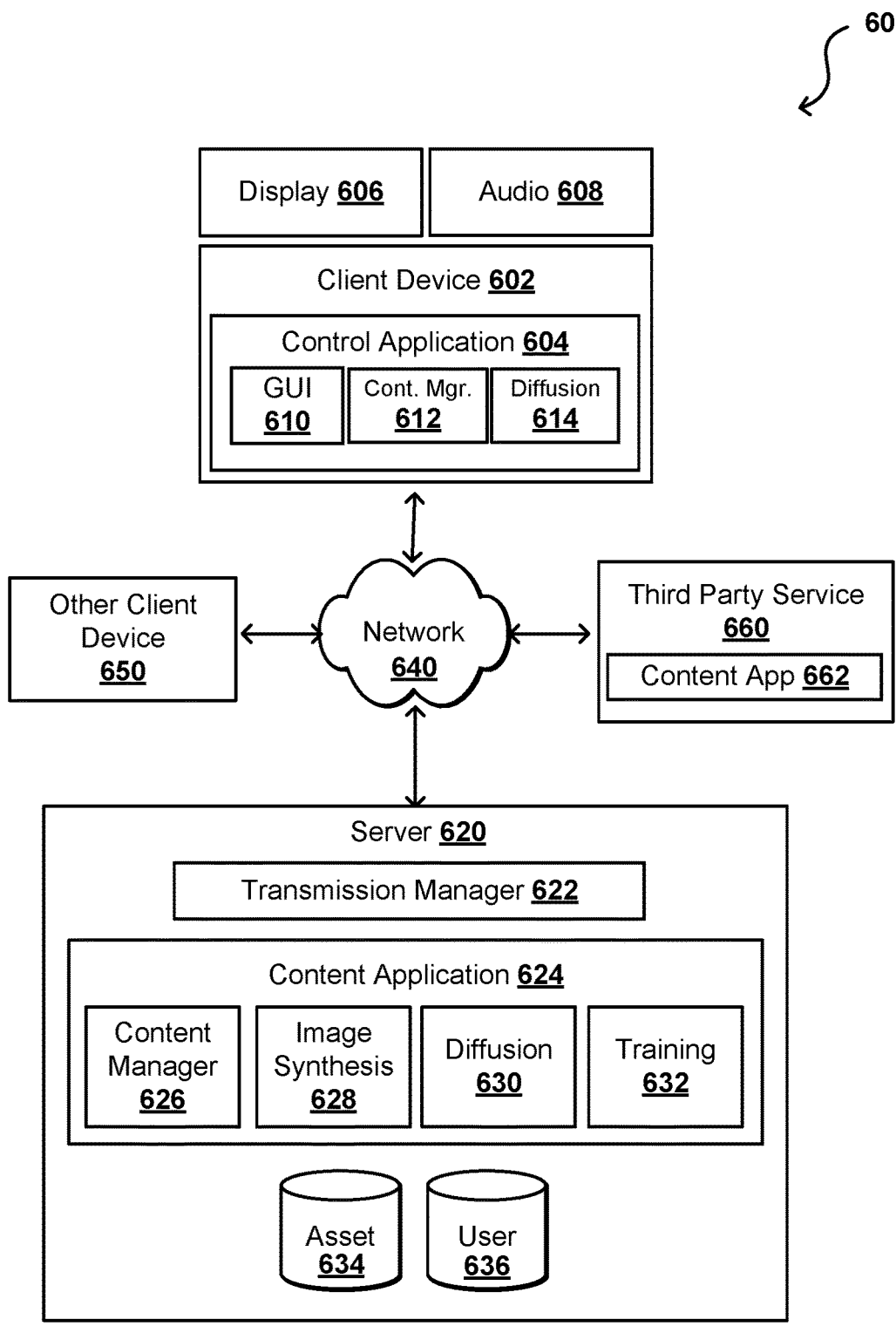
FIG. 6 illustrates components of a distributed system that can be utilized to update or perform inferencing using a machine learning model, according to at least one embodiment.

As an example, FIG. 6 illustrates an example network configuration 600 that can be used to provide, generate, modify, encode, process, and/or transmit image data or other such content. In at least one embodiment, a client device 602 can generate or receive data for a session using components of a control application 604 on client device 602 and data stored locally on that client device. In at least one embodiment, a content application 624 executing on a server 620 (e.g., a cloud server or edge server) may initiate a session associated with at least one client device 602, as may utilize a session manager and user data stored in a user database 636, and can cause content such as one or more digital assets (e.g., object representations) from an asset repository 634 to be determined by a content manager 626. A content manager 626 may work with an image synthesis module 628 to generate or synthesize new objects, digital assets, or other such content to be provided for presentation via the client device 602. In at least one embodiment, this image synthesis module 628 can use one or more neural networks, or machine learning models, which can be trained or updated using a training module 632 or system that is on, or in communication with, the server 620. This can include training and/or using a diffusion model 630 to generate content tiles that can be used by an image synthesis module 628, for example, to apply a non-repeating texture to a region of an environment for which image or video data is to be presented via a client device 602. At least a portion of the generated content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding control application 604, which may also or alternatively include a graphical user interface 610, content manager 612, and image synthesis or diffusion module 614 for use in providing, synthesizing, modifying, or using content for presentation (or other purposes) on or by the client device 602. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
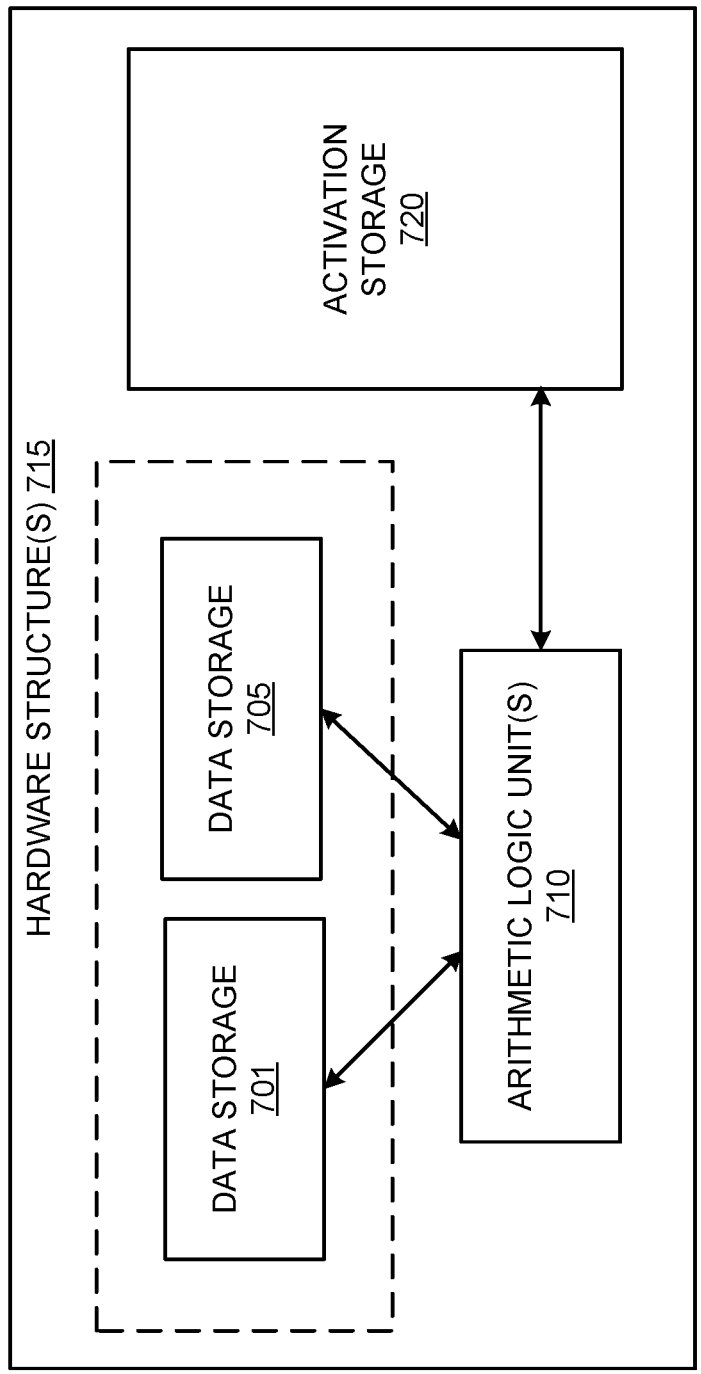
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
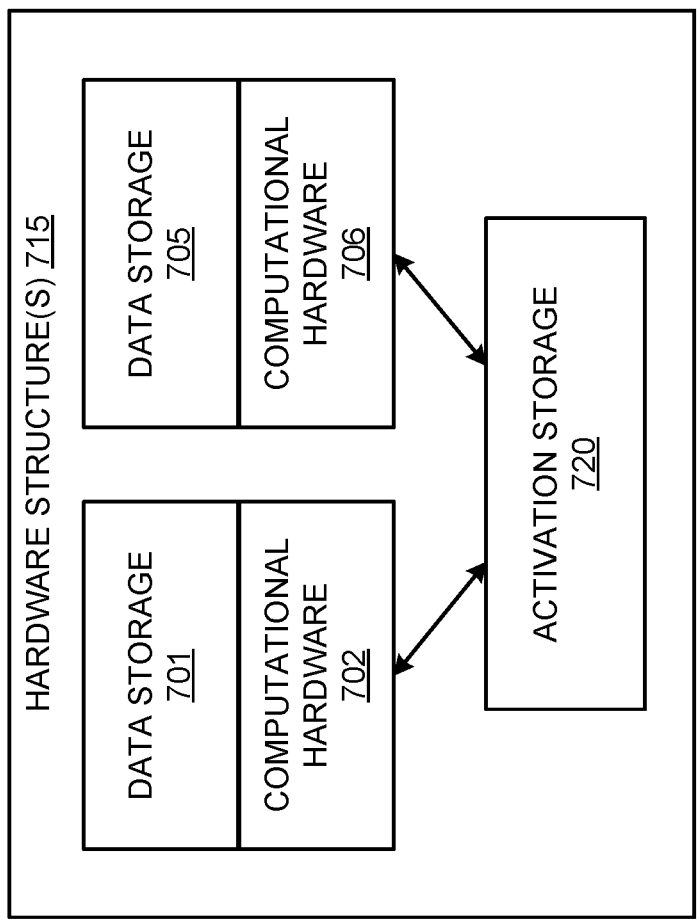
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
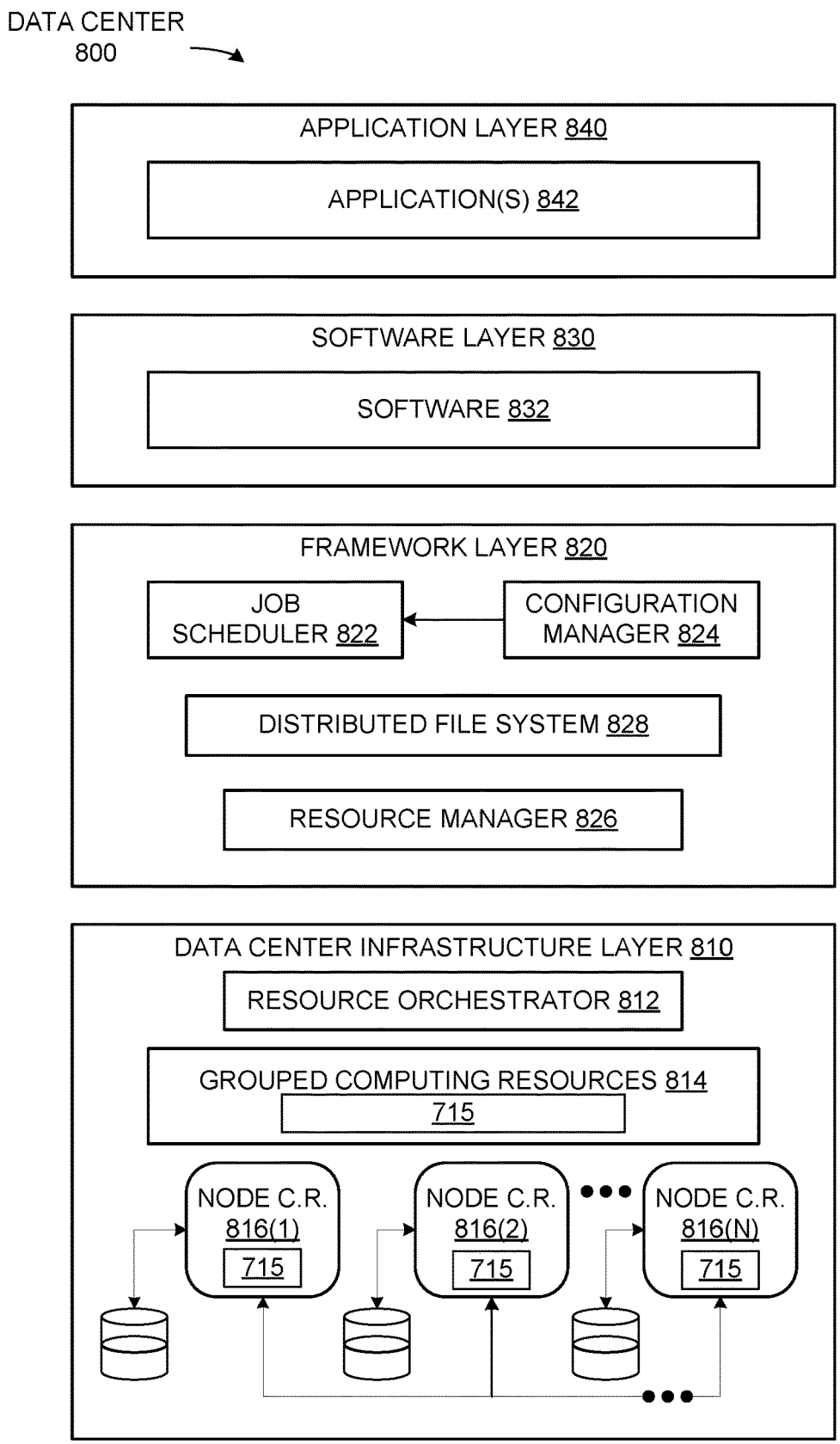
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used for evaluating microservice configuration, packaging, and deployment.

Computer Systems

Figure 9:
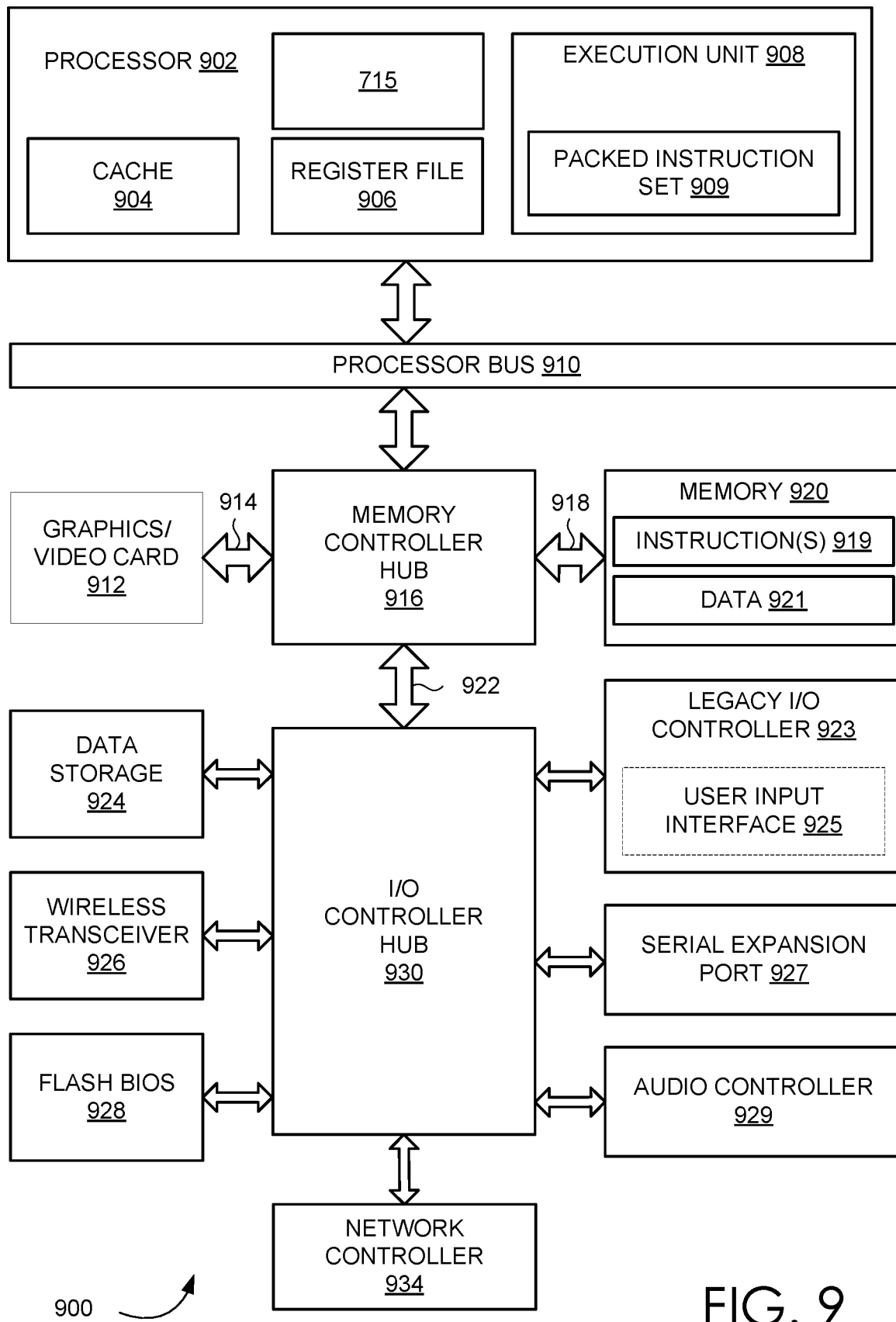
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®. XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word ("VLIW") computing microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used for evaluating microservice configuration, packaging, and deployment.

Figure 10:
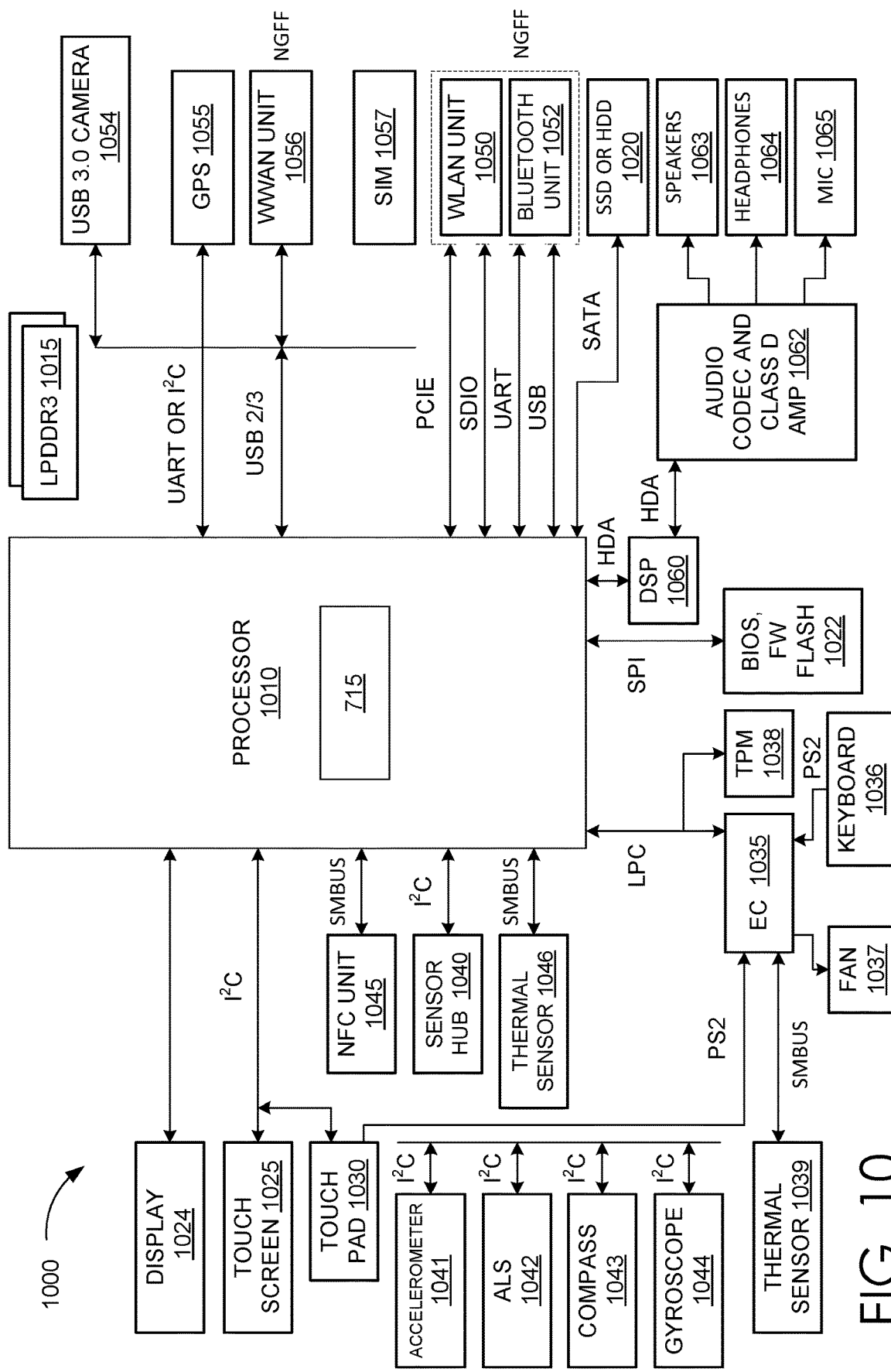
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used for evaluating microservice configuration, packaging, and deployment.

Figure 11:
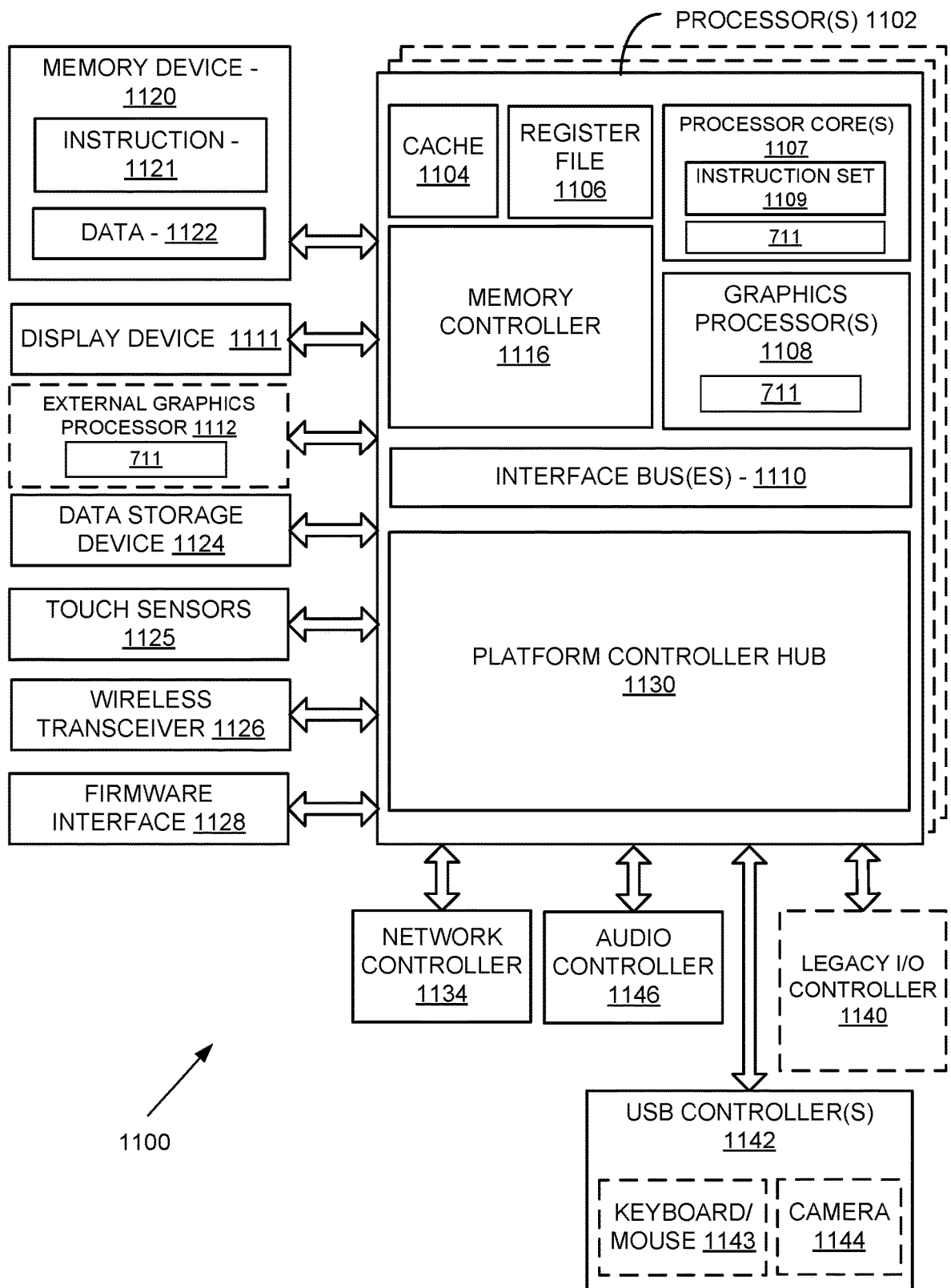
FIG. 11 illustrates at least portions of a graphics processor, according to one or more embodiments.

FIG. 11 is a block diagram of a processing system, according to at least one embodiment. In at least one embodiment, system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, coupled with, or be integrated within a wearable device, such as a smart watch wearable device, smart eyewear device, augmented reality device, or virtual reality device. In at least one embodiment, processing system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor core(s) 1107 may each process a different instruction set 1109, which may include instructions to facilitate emulation of other instruction sets. In at least one embodiment, processor core(s) 1107 may also include other processing devices, such a Digital Signal Processor (DSP).

In at least one embodiment, processor(s) 1102 includes cache memory 1104. In at least one embodiment, processor(s) 1102 can have a single internal cache or multiple levels of internal cache. In at least one embodiment, cache memory is shared among various components of processor(s) 1102. In at least one embodiment, processor(s) 1102 also uses an external cache (e.g., a Level-3 (L3) cache or Last Level Cache (LLC)) (not shown), which may be shared among processor core(s) 1107 using known cache coherency techniques. In at least one embodiment, register file 1106 is additionally included in processor(s) 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in system 1100. In at least one embodiment, interface bus(es) 1110, in one embodiment, can be a processor bus, such as a version of a Direct Media Interface (DMI) bus. In at least one embodiment, interface bus(es) 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus(es) 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controller(s) 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used for evaluating microservice configuration, packaging, and deployment.

Figure 12:
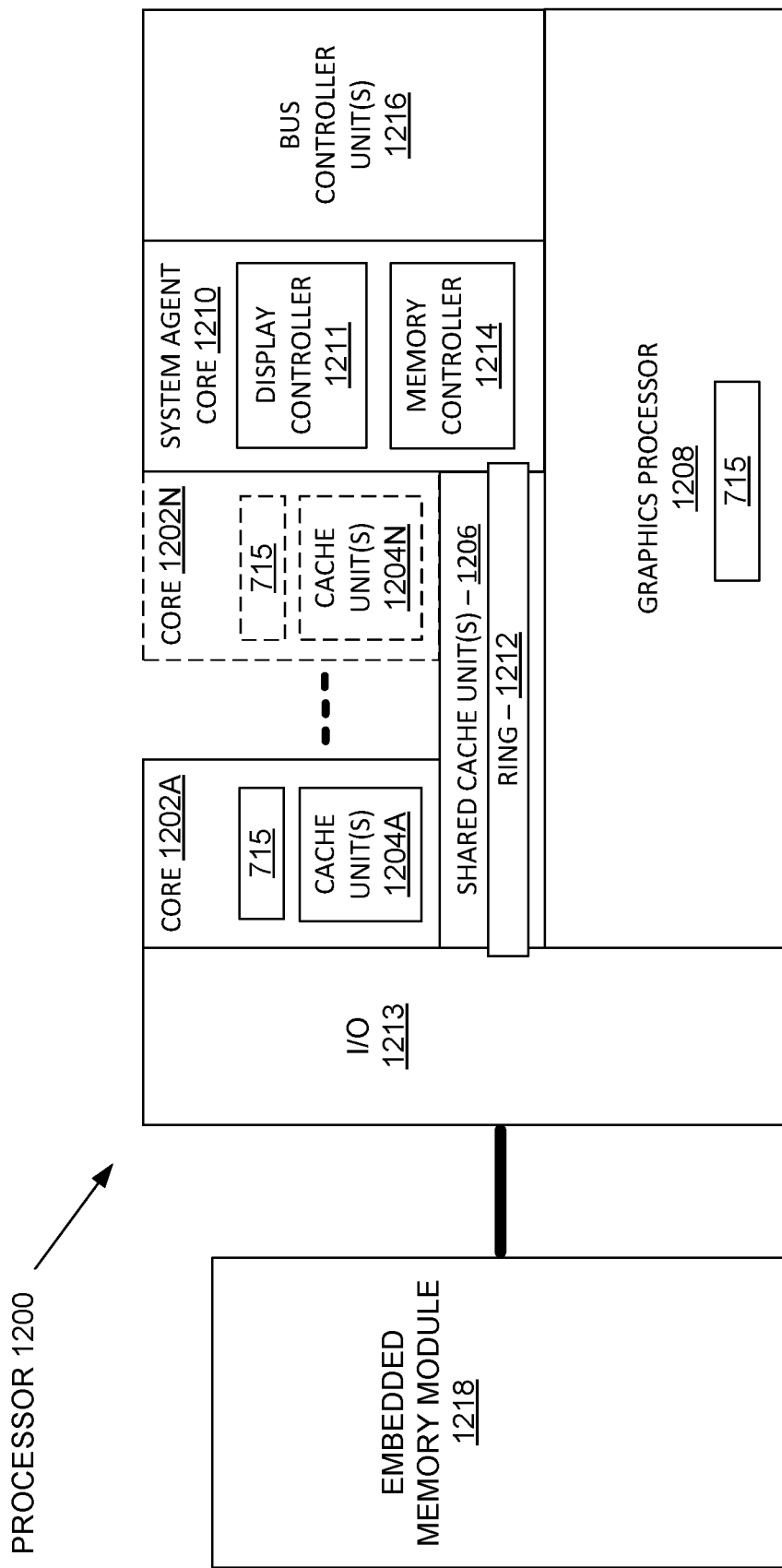
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit (PCU), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with a ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory modules 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture (ISA), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALUs embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used for evaluating microservice configuration, packaging, and deployment.

Virtualized Computing Platform

Figure 13:
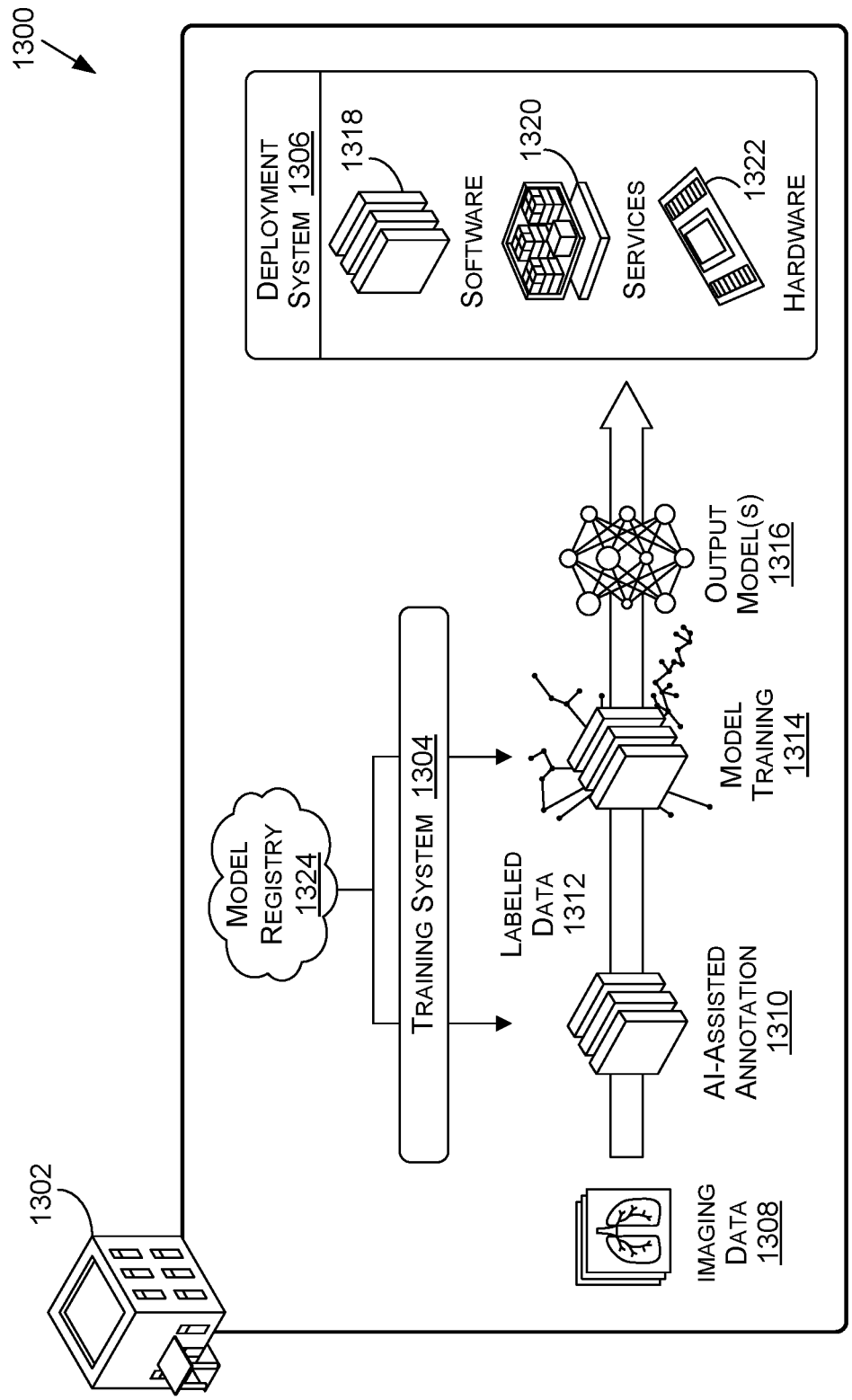
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility (ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training system 1304 (FIG. 13) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, a training pipeline may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotation 1310, labeled data 1312, or a combination thereof—may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1230 (FIG. 12)). In at least one embodiment, rather than each application that shares a same functionality offered by services 1320 being required to have a respective instance of services 1320, services 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where services 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 14:
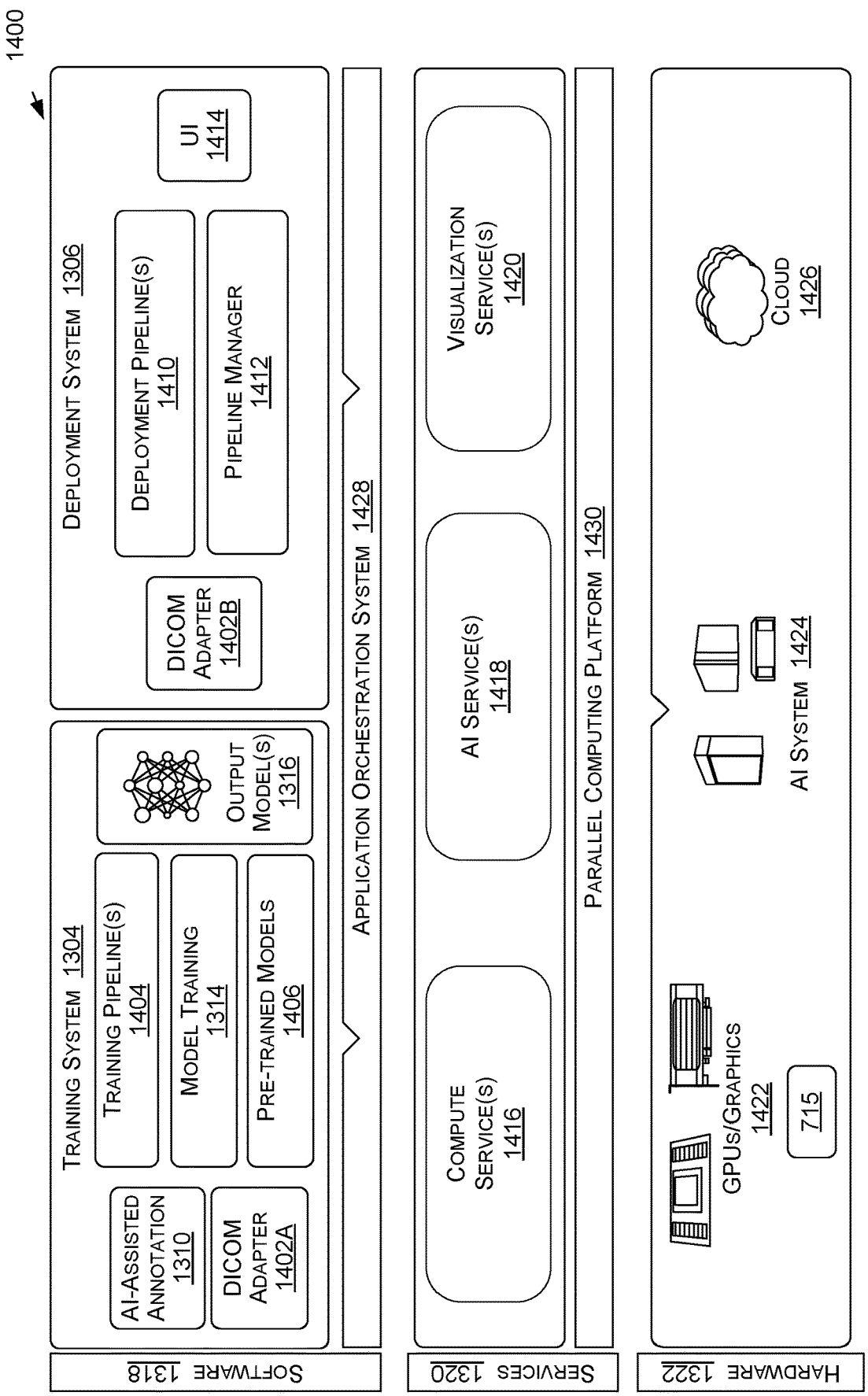
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipeline(s) 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained models 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1404 may include AI-assisted annotation, as described in more detail herein with respect to at least FIG. 14B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., a labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipeline(s) 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline(s) 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an MRI machine, there may be a first deployment pipeline(s) 1410, and where image enhancement is desired from output of an MRI machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (e.g., execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (e.g., tasked with performing one or more processing tasks of an application). In at least one embodiment, AI service(s) 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization service(s) 1420 may include an internal visualizer, cinematics, and/or other rendering or image processing capabilities or functionality (e.g., ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (e.g., NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs/Graphics 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
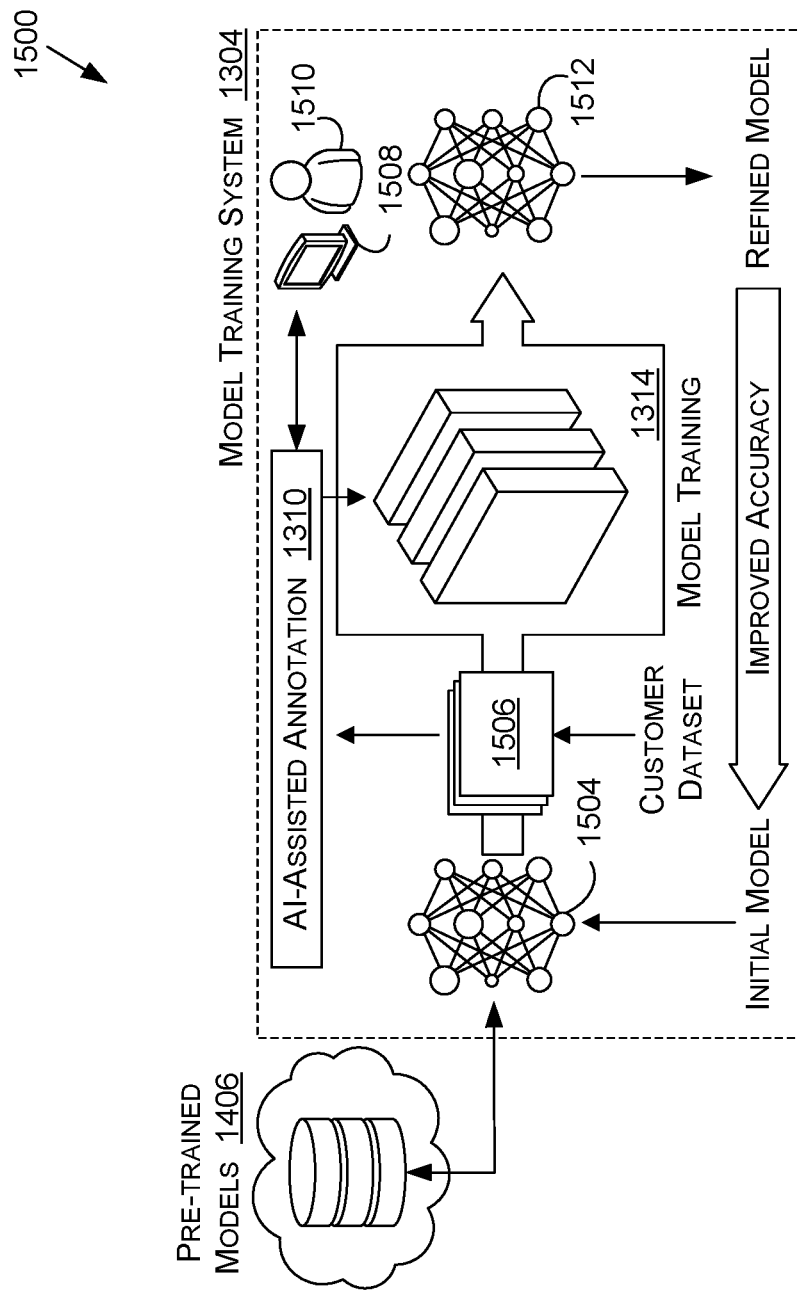

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services and/or hardware as described herein. In at least one embodiment, refined models 1512 generated by process 1500 may be executed by a deployment system for one or more containerized applications in deployment pipelines.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (e.g., weights and/or biases) that remain from prior training, so training or retraining 1514 may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained models 1506 may be stored in a data store, or registry. In at least one embodiment, pre-trained models 1506 may have been trained, at least in part, at one or more facilities other than a facility executing process 1500. In at least one embodiment, to protect privacy and rights of patients, subjects, or clients of different facilities, pre-trained models 1506 may have been trained, on-premise, using customer or patient data generated on-premise. In at least one embodiment, pre-trained models 1306 may be trained using a cloud and/or other hardware, but confidential, privacy protected patient data may not be transferred to, used by, or accessible to any components of a cloud (or other off premise hardware). In at least one embodiment, where pre-trained models 1506 is trained at using patient data from more than one facility, pre-trained models 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained models 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select a pre-trained model to use with an application. In at least one embodiment, pre-trained model may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained model may be updated, retrained, and/or fine-tuned for use at a respective facility.

In at least one embodiment, a user may select pre-trained model that is to be updated, retrained, and/or fine-tuned, and this pre-trained model may be referred to as initial model 1504 for a training system within process 1500. In at least one embodiment, a customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1510 may interact with a GUI via computing device 1508 to edit or fine-tune (auto) annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models in a model registry to be selected by another facility. In at least one embodiment, this process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tool 1536 may be instantiated based on a client-server architecture 1532. In at least one embodiment, AI-assisted annotation tool 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:
    identifying a microservice associated with a container-based cloud application;
    determining, for the microservice, a plurality of operability parameters;
    automatically populating at least a portion of the plurality of operability parameters based, at least, on one or more additional microservices for an associated global application; and
    generating, from at least the portion of the plurality of operability parameters, a deployment manifest for the associated global application.

2. The computer-implemented method of clause 1, wherein the plurality of operability parameters comprise at least one of: one or more endpoint specifications, one or more infrastructure settings, one or more input settings, one or more output settings, or one or more microservice configurations.

3. The computer-implemented method of clause 1, wherein the one or more additional microservices are communicatively coupled to the microservice.

4. The computer-implemented method of clause 3, wherein at least one additional microservice of the one or more additional microservices provides an input to a specified port of the microservice.

5. The computer-implemented method of clause 3, wherein at least one additional microservice of the one or more additional microservices receives an input to a specified port from the microservice.

6. The computer-implemented method of clause 1, further comprising:
    determining, based, at least, on one or more ingress ports or one or more egress ports of the microservice, a related microservice; and
    providing a notification to include the related microservice within the associated global application.

7. The computer-implemented method of clause 1, further comprising:
    receiving an instruction to deploy the associated global application;
    executing, prior to deploying the associated global application, one or more verification operations; and determining the one or more verification operations have a passing score.

8. The computer-implemented method of clause 1, further comprising:
    providing the deployment manifest to a deployment application.

9. A processor, comprising:
    one or more circuits to:
    determine a first microservice selected for inclusion with a global application;
    determine first configuration settings for the first microservice based, at least, on one or more parameters of the global application;
    determine a second microservice selected for inclusion with the global application;
    determine second configuration settings for the second microservice based, at least, on the one or more parameters of the global application and connectivity information between the first microservice and the second microservice;
    generate a first standardized specification for the first microservice including the first configuration settings and the connectivity information;
    generate a second standardized specification for the second microservice including the second configuration settings and the connectivity information; and
    generate a deployment specification including at least the first standardized specification and the second standardized specification.

10. The processor of clause 9, wherein the connectivity information includes connection parameters between an ingress port of the first microservice and an egress port of the second microservice.

11. The processor of clause 9, wherein at least one of the first standardized specification or the second standardized specification includes one or more endpoint specifications, one or more infrastructure requirements, and one or more operational configurations.

12. The processor of clause 9, wherein the one or more circuits are further to:
    determine, based at least in the first standardized specification, a recommended third microservice;
    automatically add the recommended third microservice to the global application; and
    generate, for the third microservice, a third standardized specification.

13. The processor of clause 9, wherein the one or more circuits are further to:
    determine a secret key for the global application; and
    populate one or more secret parameters, from the secret key, in the first standardized specification and the second standardized specification.

14. The processor of clause 9, wherein the processor is comprised in at least one of:
    a system for performing simulation operations;
    a system for performing simulation operations to test or validate autonomous machine applications;
    a system for performing digital twin operations;
    a system for performing light transport simulation;
    a system for rendering graphical output;
    a system for performing deep learning operations;
    a system implemented using an edge device;
    a system for generating or presenting virtual reality (VR) content;
    a system for generating or presenting augmented reality (AR) content;
    a system for generating or presenting mixed reality (MR) content;
    a system incorporating one or more Virtual Machines (VMs);
    a system implemented at least partially in a data center;

a system for performing hardware testing using simulation;
a system for synthetic data generation;
a system for performing generative AI operations using a large language model (LLM),
a collaborative content creation platform for 3D assets; or
a system implemented at least partially using cloud computing resources.

15. A system, comprising:
one or more processors to automatically generate a deployment manifest for a plurality of container-based microservices, the deployment manifest including respective microservice specifications for each of the plurality of container-based microservices corresponding to respective configuration settings for deployment of the plurality of container-based microservices within a common application.

16. The system of clause 15, wherein the deployment manifest includes a Helm chart.

17. The system of clause 15, wherein at least a portion of the plurality of container-based microservices are connected to one another via respective endpoints.

18. The system of clause 15, wherein the one or more processors are further to validate connections between the plurality of container-based microservices.

19. The system of clause 15, wherein the one or more processors are further to generate the respective microservice specification based, at least, on a standardized specification template.

20. The system of clause 15, wherein the system is one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a system for performing generative AI operations using a large language model (LLM),
a collaborative content creation platform for 3D assets; or
a system implemented at least partially using cloud computing resources 21. A computer-implemented method, comprising:
receiving a first selection input corresponding to a first container-based microservice;
positioning, responsive to a first placement input, a first representation of the first container-based microservice within a canvas;
receiving a second selection input corresponding to a second container-based microservice;
positioning, responsive to a second placement input, a second representation of the second container-based microservice within the canvas;
rendering, within the canvas, a third representation of an egress port for the first container-based microservice and a fourth representation of an ingress port for the second container-based microservice; and
rendering, responsive to a connection input, a fifth representation of a connection between the third representation and the fourth representation within the canvas.

22. The computer-implemented method of clause 21, wherein the egress port and the ingress port are identified based, at least, on configuration properties of the first container-based microservice and the second container-based microservice.

23. The computer-implemented method of clause 21, further comprising:
determining, from a registry, a list of compatible container-based microservices; and
providing, within a user-interface associated with the canvas, the list.

24. The computer-implemented method of clause 23, wherein the first container-based microservice and the second container-based microservice are part of the list.

25. The computer-implemented method of clause 21, wherein the third representation and the fourth representation include a common indicator representative of a compatible connection.

26. The computer-implemented method of clause 21, further comprising:
providing, responsive to an investigation input, a panel including microservice specification information.

27. The computer-implemented method of clause 21, further comprising:
receiving a third placement input, the third placement input modifying a position of the first representation of the first container-based microservice; and
moving the representation of the first container-based microservice based, at least, on the third placement input, wherein the fifth representation between the third representation and the fourth representation is maintained.

28. The computer-implemented method of clause 21, further comprising:
receiving a deletion input associated with the first representation of the first container-based microservice; and
removing both the first representation of the first-container based microservice and the fifth representation of the connection.

29. A processor, comprising:
one or more circuits to:
provide a user interface (UI) for a cloud-native application development service;
provide, for use with the UI, a populated list of compatible microservices;
generate, responsive to a first selection input, a first representation of a first microservice;
generate, responsive to a second selection input, a second representation of a second microservice; and
generate, responsive to a connection input, a third representation of a connection between a first endpoint of the first microservice and a second endpoint of the second microservice.

30. The processor of clause 29, wherein the one or more circuits are further to:
provide a first indicator for the first endpoint; and
provide a second indictor for the second endpoint.

31. The processor of clause 30, wherein the first indictor includes at least one of a geometric shape, a color, a textual label, or a selectable icon.

32. The processor of clause 30, wherein one or more first properties of the first indicator correspond to one or more second properties of the second indictor.

33. The processor of clause 29, wherein the one or more circuits are further to:
provide, for use with the UI, an informative panel including configuration information for a selected microservice.

34. The processor of clause 29, wherein the processor is comprised in at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a system for performing generative AI operations using a large language model (LLM),
a collaborative content creation platform for 3D assets; or
a system implemented at least partially using cloud computing resources.

35. A system, comprising:
one or more processors to generate a graphical user interface (GUI) having representations of connections between a plurality of microservices for a common application, the connections being rendered between respective endpoints of the plurality of microservices illustrative of data communication between the respective endpoints.

36. The system of clause 35, wherein the respective endpoints include rendered indicators, the indicators having one or more common properties between a representation of a connection.

37. The system of clause 35, wherein the one or more processors are further to provide a populated list of the plurality of microservices for selection and inclusion within a canvas showing the representations of the connections.

38. The system of clause 35, wherein the one or more processors are further to maintain respective connections responsive to movements of the microservices.

39. The system of clause 35, wherein the one or more processors are further to remove respective connections responsive to removal of one or more microservices.

40. The system of clause 35, wherein the system is one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a system for performing generative AI operations using a large language model (LLM),
a collaborative content creation platform for 3D assets; or
a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   identifying a microservice associated with a container-based cloud application;
   determining, for the microservice, a plurality of operability parameters including at least a first set of operability parameters for the microservice and a second set of operability parameters for a global application incorporating the microservice;
   automatically populating at least a portion of the plurality of operability parameters based, at least, on one or more additional microservices incorporated within the global application including at least connectivity parameters between the microservice and the one or more additional microservices;
   generating, from at least the portion of the plurality of operability parameters and the connectivity parameters, a deployment manifest for the global application; and
   deploying the global application based, at least in part, on the deployment manifest.

2. The computer-implemented method of claim 1, wherein the plurality of operability parameters comprise at least one of: one or more endpoint specifications, one or more infrastructure settings, one or more input settings, one or more output settings, or one or more microservice configurations.

3. The computer-implemented method of claim 1, wherein the one or more additional microservices are communicatively coupled to the microservice.

4. The computer-implemented method of claim 3, wherein at least one additional microservice of the one or more additional microservices provides an input to a specified port of the microservice.

5. The computer-implemented method of claim 3, wherein at least one additional microservice of the one or more additional microservices receives an input to a specified port from the microservice.

6. The computer-implemented method of claim 1, further comprising:
   determining, based, at least, on one or more ingress ports or one or more egress ports of the microservice, a related microservice; and
   providing a notification to include the related microservice within the global application.

7. The computer-implemented method of claim 1, further comprising:
   receiving an instruction to deploy the global application;
   executing, prior to deploying the global application, one or more verification operations; and
   determining the one or more verification operations have a passing score.

8. The computer-implemented method of claim 1, further comprising:
   providing the deployment manifest to a deployment application.

9. A processor, comprising:
   one or more circuits to:
      determine a first microservice selected for inclusion with a global application;
      determine first configuration settings for the first microservice based, at least, on one or more parameters of the global application;
      determine a second microservice selected for inclusion with the global application;
      determine second configuration settings for the second microservice based, at least, on the one or more parameters of the global application and connectivity information between the first microservice and the second microservice;
      generate a first standardized specification for the first microservice including the first configuration settings and the connectivity information;
      generate a second standardized specification for the second microservice including the second configuration settings and the connectivity information;
      generate a deployment specification including at least the first standardized specification and the second standardized specification; and
      execute one or more deployment applications to deploy the global application based, at least in part, on the deployment specification.

10. The processor of claim 9, wherein the connectivity information includes connection parameters between an ingress port of the first microservice and an egress port of the second microservice.

11. The processor of claim 9, wherein at least one of the first standardized specification or the second standardized specification includes one or more endpoint specifications, one or more infrastructure requirements, and one or more operational configurations.

12. The processor of claim 9, wherein the one or more circuits are further to:
   determine, based at least in the first standardized specification, a recommended third microservice;
   automatically add the recommended third microservice to the global application; and
   generate, for the third microservice, a third standardized specification.

13. The processor of claim 9, wherein the one or more circuits are further to:
   determine a secret key for the global application; and
   populate one or more secret parameters, from the secret key, in the first standardized specification and the second standardized specification.

14. The processor of claim 9, wherein the processor is comprised in at least one of:
   a system for performing simulation operations;
   a system for performing simulation operations to test or validate autonomous machine applications;
   a system for performing digital twin operations;
   a system for performing light transport simulation;
   a system for rendering graphical output;
   a system for performing deep learning operations;
   a system implemented using an edge device;
   a system for generating or presenting virtual reality (VR) content;
   a system for generating or presenting augmented reality (AR) content;
   a system for generating or presenting mixed reality (MR) content;
   a system incorporating one or more Virtual Machines (VMs);

a system implemented at least partially in a data center;
a system for performing hardware testing using simulation;
a system for synthetic data generation;
a system for performing generative AI operations using a large language model (LLM),
a collaborative content creation platform for 3D assets; or
a system implemented at least partially using cloud computing resources.

15. A system, comprising:
one or more processors to automatically generate a deployment manifest for a plurality of container-based microservices, the deployment manifest including respective microservice specifications for each of the plurality of container-based microservices corresponding to respective configuration settings for deployment of the plurality of container-based microservices within a common application, the respective configuration settings including connectivity parameters between the plurality of container-based microservices, and at least a first set of operability parameters for an individual microservice and a second set of operability parameters for the common application, the one or more process to further deploy the common application based, at least in part, on the deployment manifest.

16. The system of claim 15, wherein the deployment manifest includes one or more artifacts.

17. The system of claim 15, wherein at least a portion of the plurality of container-based microservices are connected to one another via respective endpoints.

18. The system of claim 15, wherein the one or more processors are further to validate connections between the plurality of container-based microservices.

19. The system of claim 15, wherein the one or more processors are further to generate the respective microservice specifications based, at least, on a standardized specification template.

20. The system of claim 15, wherein the system is one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center,
a system for performing hardware testing using simulation;
a system for synthetic data generation;
a system for performing generative AI operations using a large language model (LLM),
a collaborative content creation platform for 3D assets; or
a system implemented at least partially using cloud computing resources.

* * * * *